United States Patent [19]
Dowden et al.

[11] Patent Number: 5,163,083
[45] Date of Patent: Nov. 10, 1992

[54] AUTOMATION OF TELEPHONE OPERATOR ASSISTANCE CALLS

[75] Inventors: Douglas C. Dowden; Richard W. Hemmeter, both of Naperville; Diane E. Herr, Warrenville; Richard J. Piereth, Naperville; Samuel M. Salchenberger, Elmhurst; Chander S. Sehgal, Naperville, all of Ill.; Mahendra K. Verma, Marlboro, N.J.

[73] Assignee: AT&T Bell Laboratories, Murray Hill, N.J.

[21] Appl. No.: 596,809

[22] Filed: Oct. 12, 1990

[51] Int. Cl.⁵ .................. H04M 3/50; H04M 7/00
[52] U.S. Cl. .................. 379/88; 379/213; 379/223
[58] Field of Search .............. 379/88, 89, 67, 214, 379/213, 201, 223

[56] References Cited

U.S. PATENT DOCUMENTS

| | | | |
|---|---|---|---|
| 4,054,756 | 10/1977 | Comella et al. | 379/89 |
| 4,797,910 | 1/1989 | Daudelin | 379/67 |
| 4,894,857 | 1/1990 | Szlam et al. | 379/67 |
| 4,922,519 | 5/1990 | Daudelin | 379/67 |
| 4,935,956 | 6/1990 | Hellwarth et al. | 379/112 |

FOREIGN PATENT DOCUMENTS 0105441 4/1984 European Pat. Off. .
0014564 1/1987 Japan .................. 379/244

OTHER PUBLICATIONS

"The AT&T Multi-Mode Voice Systems-Full Spectrum Solutions for Speech Processing Applications", S. D. Hester et al., *Proc. of the 1985 AVIOS Conf.*, Sep. 1985 (10 pp. plus abstract).

Primary Examiner—Thomas W. Brown
Attorney, Agent, or Firm—Werner Ulrich

[57] ABSTRACT

This invention relates to methods and apparatus for automatically processing operator assistance calls. A caller is connected to an automated operator position. The automated position has speech recognition facilities to replace those of an operator, has announcement capabilities to replace those of an operator, and has control apparatus for transmitting and receiving the same set of messages transmitted and received by an operator position. Advantageously, the operator assistance switch has the same interface to an automated position as to an operator position and interacts with the two identically. Since the capabilities of the automated position are limited by its program, the automated position switches a call to an automated position when a situation occurs for which it has not been programmed. Advantageously, a switch need not be specially programmed to communicate with an automated position. Advantageously, new operator assistance services can be provided automatically without rewriting the complex control software of the switch.

51 Claims, 13 Drawing Sheets

AUTOMATION OF TELEPHONE OPERATOR ASSISTANCE CALLS

TECHNICAL FIELD

This invention relates to methods and apparatus for automating the processing of operator assistance type telecommunications calls.

PROBLEM

Over the past several decades, a great deal of toll telephone traffic which used to be handled by operators has been automated. The initial step of automating what was originally operator assistance traffic was to offer customer-dialed long distance call service. Then, customer-dialed operator assistance calls were introduced to permit operators to process calls for which the number had already been dialed. Automatic recording of telephone charges was introduced also at that time. Today, the category of fully or partially automated operator assistance telephone traffic includes coin calls, calling card calls, automatic quotation of charges for hotel guest originated calls, and partial automation of collect and person calls. In spite of the intensive effort to automate operator assistance calls, telephone companies annually spent over a billion dollars for operator wages and accompanying overhead costs.

Operator assisted calls are processed from attended operator positions attached to operator assistance switching systems or switches. These switches are operated under the control of a complex program, generally referred to as a generic program, which must be tested very carefully to ensure that no program flaws remain that could cause a system to "crash" or become non-functional. The switch communicates with operator positions by data messages used to operate displays at the operator position, and to transmit information keyed by the operator, in response to instructions from the caller, to the switch. The generic program is designed carefully to ensure that poor data received from an operator switch does not affect more than one call. A problem in such switches is that it is difficult to introduce new services and to automate operator functions because of the difficulty of changing the generic program. The largest component of operator assistance calls which have not been fully automated are collect calls and third number calls. Even these are being partially automated through the use of an arrangement known as "More Efficient Call Handling For Operator Assistance Calls" (MECH) described in T. M. Bauer et al., U.S. Pat. No. 4,899,375, which discloses an arrangement wherein an initial operator determines the type of call and then is disconnected while the call is being set up and the called customer is being alerted; subsequently, a second operator is attached to the call only if necessary, for example, after an answer for collect calls.

In A. N. Daudelin, U.S. Pat. No. 4,797,910, a speech recognition unit that is a part of an operator assistance switch is used to determine a call type, and cooperate in the automatic establishment of the call. When the called party answers on a collect call, the speech recognition unit determines whether the called customer accepts the call.

Another arrangement is described in Comella et al: U.S. Pat. No. 4,054,756, wherein customers with DTMF stations key initial digits indicating the type of call, then key all necessary numerical information (including, for example, the identification of the third number). For collect or third number calls, the calling customer records his or her name for identification purposes to the collect or third number party; the latter then keys an acceptance signal if the call can be allowed to proceed.

In another arrangement recently announced by Northern Telecommunications, Inc., a caller dials a number including an indication of a call type, and on a collect call, when prompted to do so, speaks his or her name. After the call has been established to the called customer for a collect call or to the third party for a third number call, a speech recognition unit is used to detect whether the called customer accepts the call by speaking a "yes" or a "no". A speech processing unit is connected via a segregated transmission facility for handling these calls. If the called customer has a DTMF station, the called customer or the third party can key an acceptance instead of speaking such an acceptance.

In view of the foregoing, a need exists in the art for an arrangement that facilely automates many of the remaining operator assistance calls, such as collect calls and third number calls, which still require the assistance of an operator.

SOLUTION

The above problem is solved and an advance is made over the prior art in accordance with the principles of our invention wherein an unattended automated position is substituted for some of the operator positions attached to an operator assistance switch; such an automated position includes means for recognizing commands such as speech commands, for making announcements to a connected telephone customer, and optionally, for detecting DTMF digits and for recording speech. In one preferred embodiment, the interface between the operator position and the operator assistance switching system is maintained for the automated position so that the existing data communications in both directions are the same. The assistance switching system communicates with the positions using the same messages for generating displays at the operator position and the automated position. Similarly, the automated position communicates with the switching system using the same messages used by the operator position for controlling switching system operations. If an automated position cannot process a particular call, either because the call type is not anticipated in the program controlling the automated position, or because the automated position cannot recognize the caller's speech, the automated position sends a data message to the switch asking that the call be switched to an attended operator position. Advantageously, the switching system has already been designed to react in a safe manner to any combination of control signals from the operator position so that the amount of damage inflicted on other calls as a result of improper performance by an automated position is highly restricted.

For processing a collect call, the automated position first announces to the customer a request for selection of a call type and recognizes the requested command issued by the customer as a spoken "collect" or its DTMF equivalent. This data is reported to the switch which makes a database check to ensure that the called customer is of a type that may accept collect calls. For example, pay phones and phones located in prisons typically are not allowed to accept collect calls. Certain countries will not accept collect calls. If the database check indicates that a collect call can be accepted, the automated position announces a request that the customer speak his or her name and records the response. The call is then set up to the called customer. When the called customer responds to an alerting (e.g., ringing) signal by going offhook, an announcement is transmitted from the automated position to the called customer saying: "You have a collect call from" followed by the recorded name. The announcement continues: "If you wish to accept the charges, please say yes". If the called customer says "yes" and this speech signal is recognized by the speech recognition unit, then a confirmation announcement is given, the call is completed as a collect call, and the switching system is notified by the automated position that the billing is to be arranged as collect call billing. The called party is also offered the opportunity to say "no" or to go onhook if the charges are not accepted.

For a third number call, the automated position first requests the type of call. Upon detecting the words "third number" or their DTMF equivalent, the automated position requests the customer to supply the third number either by keying the number on a DTMF station or by speaking the number. The automated position also requests that the caller speak his or her name, and records the response. The automated position then reports the billing number and the call type to the switching system. The switching system checks databases to determine what type of verification is required before the call can be completed. Assume that the switching system determines that it is necessary to consult the third party to verify that the third party is willing to pay. The switching system then sets up a connection to the customer station of the third number. After that customer station answers, the automated position announces to that station the identification of the call as a request that the third number pay for a call, followed by the recorded name of the caller, followed by a request: "Will you accept charges for this call? If so, say yes". The response is then detected by the automated position which, if it detects a positive response, will signal to the switching system to set up the call. The third party is also offered the opportunity to say "no" or to go onhook if the charges are not accepted.

The automated position can access a remote database in essentially the same way that an operator position does. The automated position sends the same kinds of messages and performs the same kind of data interpretation of the return message as is performed by an operator at a conventional operator position.

If a customer feels the necessity of invoking the services of a live operator, the automated position is capable of detecting the word "operator" or DTMF 0 and responding to the detection of that input by signaling the operator assistance switching system to connect the call to an operator position staffed by a live operator. This reconnection feature uses a feature that exists in AT&T's Operator Services Position System (OSPS) for transferring a call from one operator position to another for invoking the services of an operator supervisor.

In accordance with one specific embodiment of the invention, the operator assistance switch is a switch arranged to interface with integrated services digital network (ISDN) terminals. The automated position interfaces with the two B-channels and one D-channel of a basic rate interface of ISDN using one 64 kilobit B channel for voice signals and using the 16 kilobit D channel for control and signaling signals and for database access.

Once the automated position has been installed, it is a relatively straightforward matter to increase the number and complexity of the scripts to be followed by such automated position groups because the protection in the switching system against adverse results from receiving improper control signals from the operator position is already a basic part of the operator assistance switch. It is not necessary to modify the generic program of such a switch for accepting such additional scripts; the modification of the generic program requires great care in its introduction because a software error can cause the switch to fail.

Monitoring of the performance of an automated assistance position is straightforward. Monitoring an operator in a system such as the Operator Service Position System (OSPS) which is a feature of AT&T's 5ESS ® switch and is described, for example, in Document AT&T 5D5-520-105, Operator Services Position System, Toll and Assistance Video Display Terminal Description and Operation. This system has been arranged to allow any operator position to monitor any other operator position. Monitoring of an automated position from a monitoring operator position is performed in the same way. While monitoring, the monitoring position receives all messages destined for the monitored position and receives all messages generated by the monitored position. As a result, the introduction of a new service can be tried on one automated position and the performance of that automated position can be monitored by a live operator sitting at a monitoring position. Alternatively, the automated position can be monitored by allowing an operator to bridge a headset across the voice signal path and to observe visual displays displayed on a screen of the automated position. Advantageously, this arrangement allows for a straightforward and safe check of a new service feature.

In accordance with another feature of the OSPS, operator positions may be divided into teams and a flexible arrangement created for flowing traffic between these teams. This feature is known as intraflow and is described, for example, in AT&T 5ESS Switch Feature Handbook. When introducing a new feature, the new feature is first introduced into a small number of automated positions which form a separate team and the performance of this separate team is carefully monitored. Any excess traffic is handled by operator positions using the intraflow feature. After satisfactory performance has been established, the software for the new feature can be loaded into other automated positions which can then be added to the original team on which the feature was tested.

In one embodiment of the invention, a voice processing unit and data processor serves four ports on the operator assistance switch, thus effectively sharing the unit over four automated positions. The number of ports served by a voice processing unit is a traffic engineering decision based on unit capacity and reliability requirements. This arrangement allows the voice processing unit and data processor to be shared, thus lowering per port cost of automated positions.

DETAILED DESCRIPTION

Figure 1:
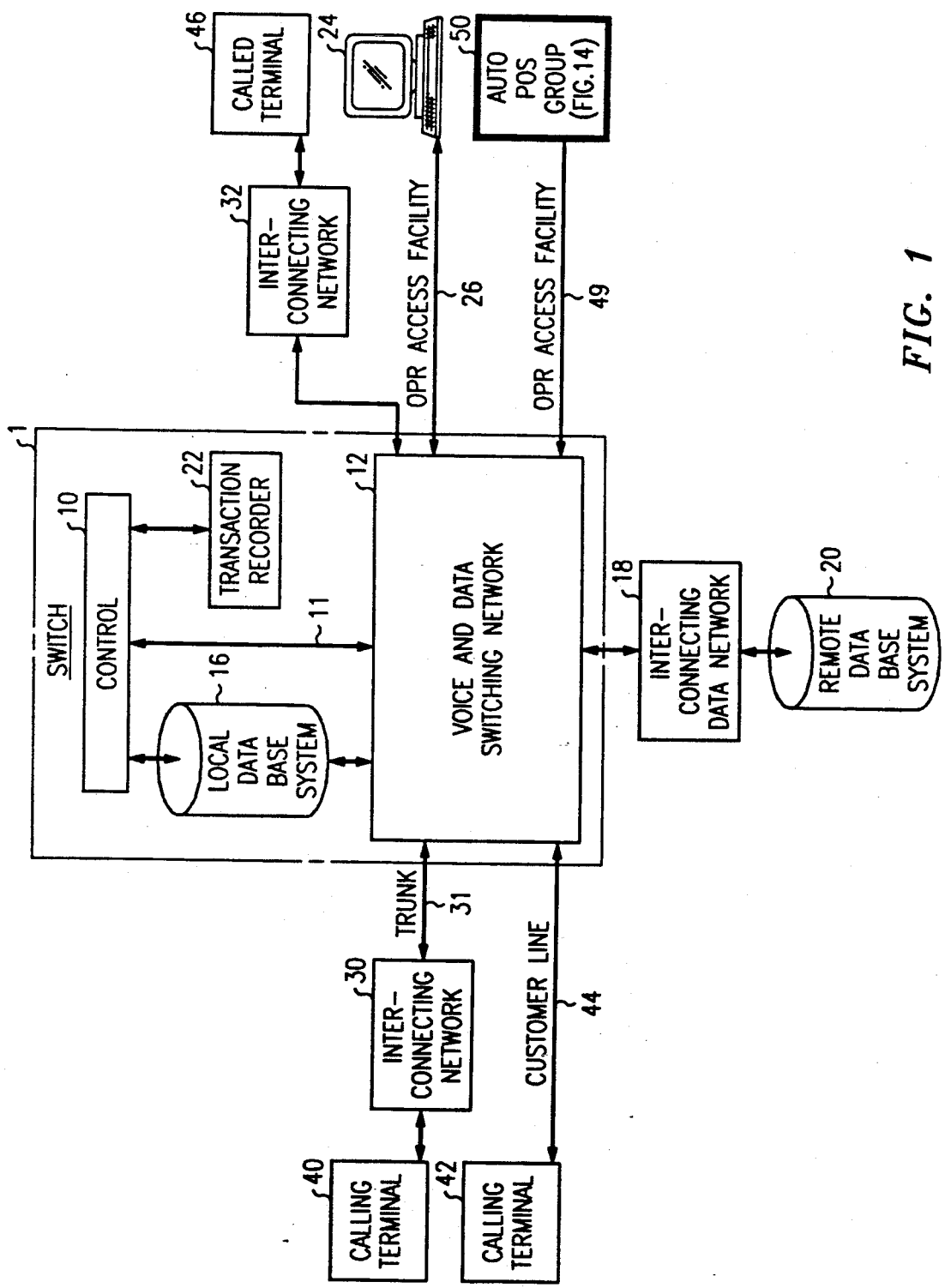
FIG. 1 is an overall block diagram of an operator assistance switch and a connected operator position and automated position group.
Figure 2:
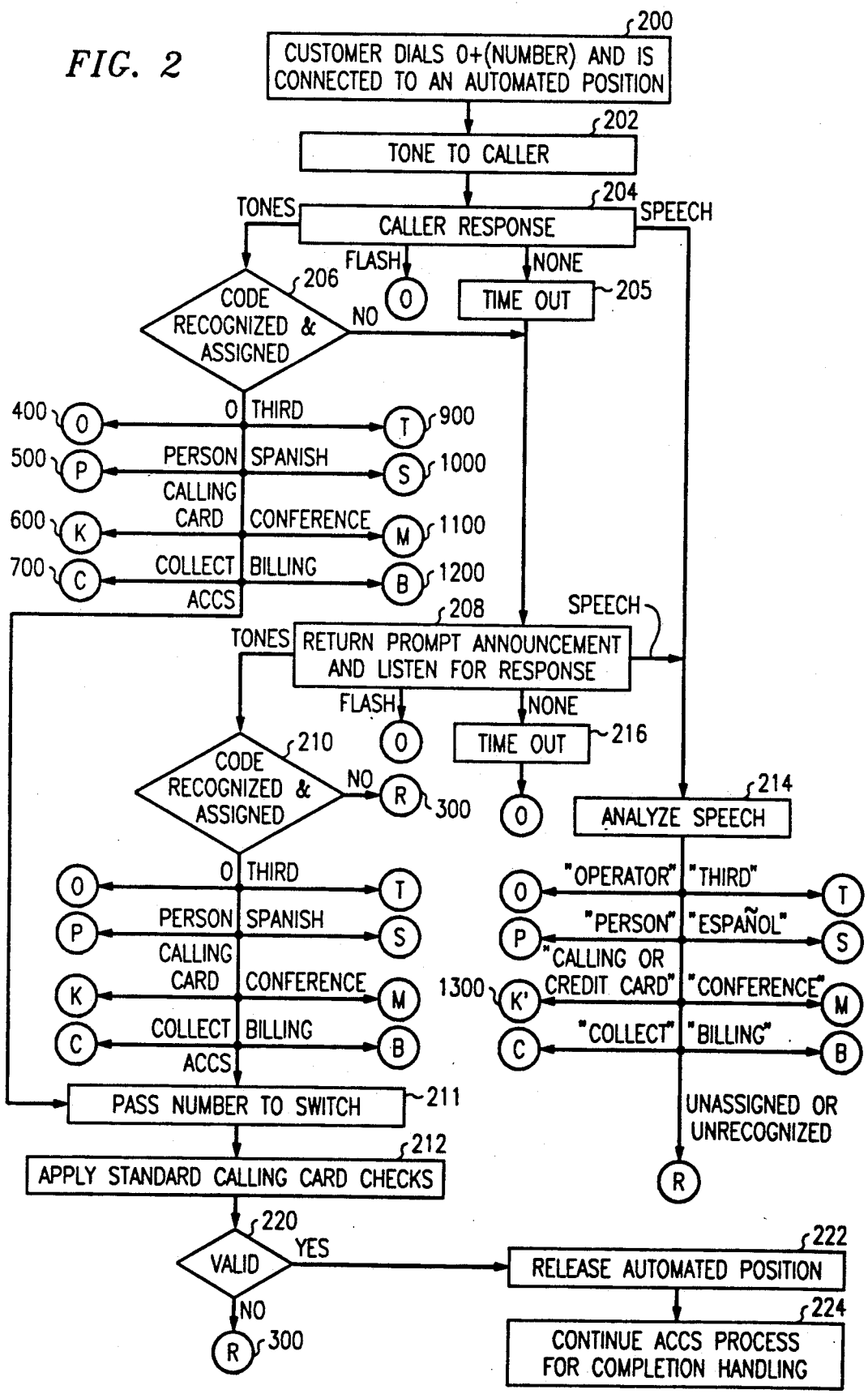
FIGS. 2-13 are flow diagrams of methods of processing operator assistance calls in conformance with the principles of this invention.

The principles of the present invention may be understood by examining an exemplary embodiment. FIG. 1 is a block diagram of a system arranged to incorporate the present invention. The novel portion of FIG. 1 is an automated position group, block 50, shown in heavy outline and expanded in FIG. 14. Block 1 represents a telecommunications switch operating under stored program control and having within it the elements necessary for practicing the invention. Switch 1 is a switch such as the 5ESS switch manufactured by AT&T Technologies, Inc., arranged to offer the Operator Services Position System (OSPS) features. The 5ESS switch is described, for example, in *AT&T Technical Journal*, v. 64, no. 6, part 2, pp. 1305-1564, and the OSPS feature is described, for example, in Paper 3, Session 22C presented at the International Switching Symposium in May, 1984.

Within switch 1 are various blocks for carrying out the functions of a telecommunications switch. Control 10 is a distributed control system operating under the control of a group of data and call processing programs to control various blocks of the switch. In order to practice the present invention, the operator services control programs must be augmented by programs described in the flow charts of FIGS. 2-13. Control 10 is used to control operations of switch 1. Block 12 is a voice and data switching network capable of switching voice and/or data between inputs connected to the switching network.

In this embodiment, network 12 has integrated voice/data outputs in the Integrated Services Digital Network (ISDN) format. The switch communicates with operator positions over an ISDN connection with a Basic Rate Interface (BRI) for communicating two B-channels (64 kbit/second (kb/s)) and one D-channel (16 kb/s). The B-Channels are used for voice signals in this embodiment. Connected to the switch are a conventional operator position 24, attended by a human operator, and automated position group 50, shown in detail in FIG. 14. The automated position group 50 serves four simultaneous calls and includes facilities for performing voice processing. The voice processing arrangement receives an input signal which may be either voice or a dual tone multifrequency (DTMF) signal and has the capability for analyzing that signal to distinguish among the various allowable DTMF signals and among the individual elements of a predetermined list of spoken responses. The voice processing arrangement also generates tones and voice messages to prompt a customer to speak or key information into the system for subsequent recognition by the voice processing unit. In addition, the voice processing unit has the capability for recording a short customer response, typically, a name, for subsequent playback to a called terminal. These recordings may also be saved for subsequent use in fraud detection. For example, evidence can be accumulated for stations with a high propensity for fraud. Within the automated position group, the voice processing arrangement generates an output data message, representing the result of the voice processing; this output message is used as an input to a program in the automated position group for controlling the generation of position messages to the switch 10. In response, the switch controls the establishment of connections in switching network 12 and generates display data for the automated position 50. The Conversant® Voice Information System, manufactured by AT&T Technologies, Inc., is one unit which can be used to carry out the functions of the voice processing arrangement.

Two types of data base systems are used by switch 1 in order to set up operator assistance calls in conformance with the principles of this invention. Local data base system 16 is directly accessible by control 10 of switch 1 via switching network 12. Remote data base system 20 is accessible to control 10 of switch 1 via switching network 12 and an interconnecting data network 18. A remote data base system is typically used for storing data that is shared by many switches. For example, a remote data base system might store data pertaining to customers for a region; the particular remote data base system that is accessed via data network 18 would be selected to be the remote data base system associated with the region of the called terminal. Interconnecting data network 18 can be any well known data network and specifically could be a common channel signaling system such as the international standard telecommunications signaling system CCS 7.

Transaction recorder 22 is used for recording data about calls for subsequent processing. This data typically is billing data which is subsequently sent over a data link to be processed by a billing processor in order to prepare customer bills. The transaction recorder is also used for recording traffic data in order to engineer additions properly and in order to control traffic dynamically.

Operator position 24 connected to switch 1 comprises a terminal for use by an operator in order to control operator assistance calls. Data displays for the terminal of operator position 24 are generated by control 10. Operator position 24 is connected to the voice and data switching network 12 by operator access facility 26 which may include carrier facilities in order to allow the operator position to be located remotely from switching network 12. Alternatively, operator access facility 26 may be a simple voice and data access facility if the operator positions are located in close physical proximity to the switching network. Only one operator position is shown in FIG. 1 but it is understood that a typical switch, arranged to offer operator assistance services, has access to a large number of such operator positions.

It is often desirable that certain kinds of operator functions be assigned to specialized teams. One example is Spanish-speaking operators who could be accessed by customers with English language difficulties whose native language is Spanish. Another example is operators who have access to the special facilities required for setting up conference calls. Still another example is operators from a customer credit and service bureau who have access to customer billing records who can handle customer requests for billing information and for credit in case a customer reached a wrong number. In order to access the proper one of these operator teams, a customer's spoken command, or, in the case of a customer with a DTMF terminal, a keyed command code is used. In some cases (not shown in FIG. 1) specialized teams may be attached to a different switch in which case an interconnecting network is used to connect the originating customer to that switch for connection to an operator from an appropriate operator team.

Connected to switch 1 are interconnecting networks 30 and 32. These are networks which may include one or more switches and which are used for interconnecting voice and data signals between customer terminals and switch 1. Also connected to switch 1 are customer lines, including customer line 44, for connecting a calling terminal 42 to switch 1. The word "terminal" as used herein includes a simple customer telephone station, a customer station with more elaborate features such as magnetic stripe card readers, or a customer voice/data terminal. Calling terminal 40 is connected through interconnecting network 30 to switch 1. In this specific example, calling terminal 40 is connected by a customer line to a 1AESS switch and that switch is connected to trunk 31 which is connected to switch 1. For the sake of clarity, a separate interconnecting network 32 is shown as being interposed between switch 1 and called terminal 46. In practice, interconnecting networks 30 and 32 are parts of a much larger common carrier network. In the example call described below, interconnecting network 32 contains different switches from interconnecting network 30. Called terminal 46 is connected to interconnecting network 32 and via that network can be accessed by switch 1. If the calling terminal is not directly connected to switch 1, the directory number of the calling terminal, identified, for example, by automatic number identification, is transmitted from the switch connected to the calling terminal to switch 1.

The term "operator assistance call" as used herein also refers to calls some of which are already automated. For example, Automated Calling Card Service (ACCS) has made it possible for customers having a DTMF terminal to place a calling card call without requiring the services of an operator. As discussed hereinafter, other classes of operator assistance calls may also no longer require the service of an operator according to the principles of this invention. Thus, the term "operator assistance call" refers to those classes of calls which have in the past usually required the service of an operator, such as those which are dialed with an initial digit 0.

In order to illustrate the basic principles of the invention, a simple collect call from calling terminal 42 to called terminal 46 will be described. The customer at a calling terminal is referred to as a calling customer or caller. In this example, the called customer at terminal 46 has agreed ahead of time to accept collect calls but wishes to be informed when an incoming call is a collect call. The caller at terminal 42 dials or keys 0, followed by the directory number of called terminal 46. This number which is dialed over customer line 44 is received in voice and data switching network 12 and passed to control 10 via control access 11. Control 10 analyzes this dialed (using a dial terminal) or keyed (using a DTMF terminal) number and recognizes that calling terminal 42 has placed some kind of operator assistance call. In order to determine whether this is a calling card, third number (third), person-to-person (person), collect, Spanish-speaking (Spanish), conference, billing or other operator assistance call, it is necessary to connect the calling customer at terminal 42 to a port of automated position group 50. After this connection has been established, automated position group 50 returns a (prompting) tone to calling terminal 42. In response to this tone, if the calling customer at terminal 42 has a DTMF telecommunications terminal, the customer will dial a two-digit command code identifying the class of the call to be placed as a collect call. If the calling customer does not have a DTMF terminal or chooses to speak, then the customer can speak one of the allowed call type phrases such as: collect, calling card, person, third number, operator, Espanol (to request a Spanish-speaking operator), conference, or billing, and, in this case, will say "Collect". If the calling customer fails to key in the command code or to speak the command, he or she will be prompted by an announcement which says: "Please say collect, calling card, person, third number, Español, conference, billing, or operator now." The keyed command code, or the spoken command is analyzed by automated position group 50 which determines that a collect call is to be set up. The tone or announcement is used to prompt the calling customer to give the requested response. After a time, only the tone may be required since customers will learn to interpret the tone as a prompting signal. To reassure the calling customer, that customer receives an announcement from voice processing unit 1405 (FIG. 14) of automated position group 50, while the call is being set up, to indicate that a collect call is being set up from his terminal to the called customer.

A connection is then set up through interconnecting network 32 to called terminal 46. The characteristics of called customers, with respect to what kinds of collect calls they will accept, are stored in regional data base systems such as remote data base system 20 which contains data for called terminal 46. Other kinds of originating and terminating customer data are stored in local or remote data base systems as convenient. System 20 is queried before the connection to the called customer is being established. For this example call, the query indicates that the called customer will accept all collect calls but wishes to be informed that an incoming call is collect.

When called terminal 46 answers, the answer signal is transmitted back to swithching network 12 and is passed to control 10 via control access 11. When control 10 receives this answer signal, control 10 sets up a connection in switching network 12 from automated position group 50 through interconnecting network 32 to called terminal 46 to announce to the called customer that this is a collect call. Since called customer 46 has agreed in advance to accept all collect calls, the call between calling terminal 42 and called terminal 46 may be set up through switching network 12 after this announcement has been received by the called customer. Note that this exemplary call has been established without requiring the services of an operator.

Customers may specify that they will accept all collect calls, that they wish to decide without further data whether or not to accept each collect call, that they want to know the name of the calling party and wish to decide for each call, or that they will accept no collect calls. Alternatively, an announcement to the called customer announcing a collect call could include the area code, the geographic locality, or the full directory number of the calling customer in order to supply the called customer with further call data that he can use in order to decide whether to accept the call, or could include a recording, made in the automated position group by the caller, of the caller's name.

In this specific embodiment, automated credit card calls are detected in parallel with other types of automated operator calls. This is in contrast with the present arrangements wherein card calls are detected first when a customer keys a calling card number in response to an initial "bong" tone. A disadvantage of this arrangement is that ACCS calls must be routed to an automated position, thus utilizing the more expensive resources of an automated position instead of being connected to a DTMF detector. The advantage of the operation disclosed herein is that there is no need to wait for a timeout following the ACCS tone before attaching the automated position thereby providing faster service to customers for calls other than ACCS. An additional advantage is that the switch owner can modify the treatment of ACCS calls within the automated position without changing the control program of the switch.

FIGS. 2-13 are flow diagrams of the process of handling operator assistance calls under the control of the automated position group 50 and the control 12 of the switch. The process begins when a customer dials 0 plus a directory number. (Calls to 0 with no further numbers are routed to operator positions since they may be emergency calls.) The customer is then connected under the control of 12 to an automated position (action box 200, FIG. 2). The automated position returns a tone to the caller (action box 202). The next action of the automated position depends on the input from the calling customer (decision box 204). If the calling customer speaks, the program executes a transfer to box 214, discussed further below. If the calling customer keys DTMF signals into the system, test 206 is performed. Test 206 determines whether the numbers represented by the customer's keyed tones correspond to one of the codes used for identifying the class of an operator assistance call, a telephone number, or the format of a calling card number, or none of these. If the tones correspond to the format of a calling card number, the number is passed to the switch (action box 211) and standard ACCS treatment of the call is invoked (action box 212). With this standard treatment, the calling customer's calling card number is checked for validity, and, if the calling card number is valid, the call is completed. Command codes are assigned to identify classes of operator assistance calls; the example classes are operator (O), collect (C), calling card (K), person-to-person (P), third number billing (T), Spanish (S), multi-party conference (M), and billing credit (B). The codes for these classes of calls might, for example, be the digits 11-18, the digits 19 being reserved for 10 additional services, identified by 19X. 1 is a preferred initial number for these codes since this number can never be the initial number of a calling card or telephone number. By using 1 as the initial digit, it is not necessary to time for possible additional digits after a two-digit command code has been keyed. The present embodiment of the invention can therefore be used without interfering with ACCS treatment of credit card calls. In terms of the flow chart, once one of these codes is recognized, the appropriate subroutine for handling this type of call is entered. These subroutines have been called O for operator (subroutine 400), C for collect calls (subroutine 700), K for calling card calls (subroutine 600), P for person-to-person calls (subroutine 500), T for third party billing calls (subroutine 900), S for Spanish-speaking operator (subroutine 1000), M for multi-party conference operator (subroutine 1100), and B for (billing) customer credit and service bureau operators (subroutine 1200).

The automated calling card service program including blocks 211, 212, 220, 222, and 224 are performed under the control of switch control 12. First, the calling card number that has been keyed is passed from the automated position to the switch controller 12 (action block 211). The switch controller 12 applies standard ACCS checks (action block 212). These checks include a check for the correct number of digits, a query of a remote data base to ensure that the account number is valid, and a check that card billing is allowed from that calling number to that called number. If the calling card is found to be valid in test 220, then the automated position is released (action block 222) and the call is processed by a program for processing ACCS calls that is a part of the program of control 12 (action block 224). If the calling card number is not valid as determined in test 220, then the actions to be described below for reprompt announcements starting with action block 302 are performed in the automated position.

If no code is recognized (test 206) or if no tones have been transmitted from the customer to the system within a predetermined interval (timeout, action box 205), the voice processing unit 1405 (FIG. 14) of automated position group 50 returns a prompt announcement such as "Please say collect, calling card, person, third number, Español, conference, billing, or operator now," and awaits a response by the calling customer (action box 208). If tones are detected when this announcement has been made, test 210, similar to test 206, is performed. Test 210 checks the code represented by the tones keyed by the calling customer. If these tones correspond to a calling card number, the program executes a transfer to action boxes 211 and 212 in order to apply the standard Automated Calling Card Service (ACCS) treatment. If one of the operator assistance command codes is recognized, a transfer to the corresponding subroutine is executed. If an unrecognized code has been keyed, a transfer is executed to subroutine R (subroutine 300, FIG. 3) to give the calling customer a reprompt announcement.

If decision boxes 208 or 204 recognize speech, then this speech is analyzed (decision box 214) in order to detect one of the types of operator assistance calls, or to detect that the speech signal is inadequate to properly classify the type of operator assistance call. If a request for one of the classes of operator assistance calls is recognized, then a transfer is made to one of the subroutines O, C, K, P, T, S, M, or B; if no command corresponding to an operator assistance call is so recognized, a transfer is made to subroutine R (subroutine 300, FIG. 3) for a reprompt announcement.

If, at the time that the caller response is analyzed in decision box 204, a customer flash is recognized, a transfer is made to subroutine O (subroutine 400, FIG. 4) in order to connect the customer to an operator. A customer may flash in order to be connected to an operator. Similarly, if, following the prompt announcement (decision box 208), the customer flashes, a transfer is made to the subroutine O (subroutine 400, FIG. 4). If the customer does nothing following the prompt, a timeout is detected in action box 216 and a transfer to subroutine O (subroutine 400, FIG. 4) is executed in order to connect the calling customer to an operator.

Figure 3:
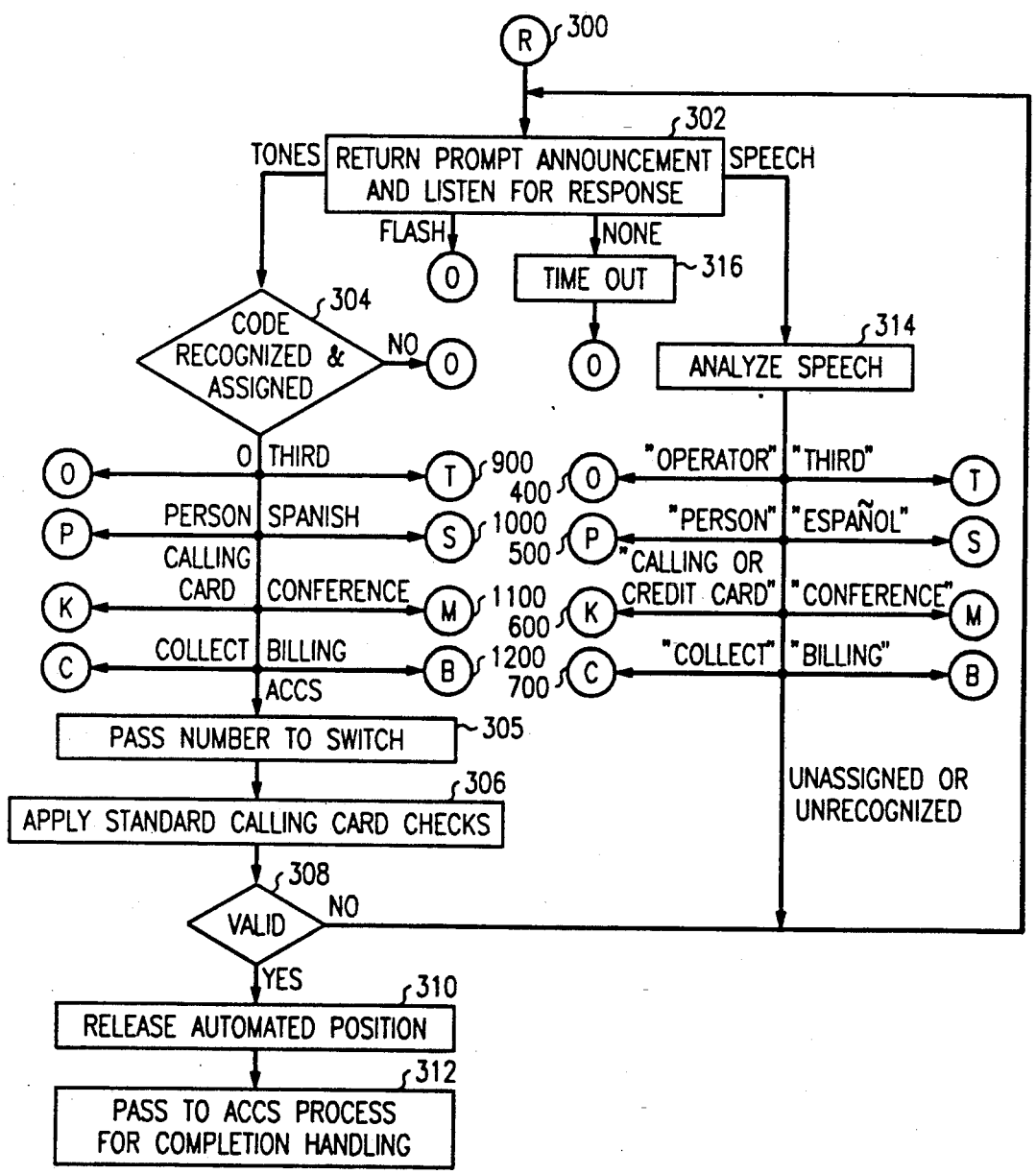

FIG. 3 illustrates the actions performed by the program in case the customer response is unrecognizable speech or an unassigned pair of DTMF signals. The first step of subroutine R (300) is to reprompt the caller with an announcement and listen for a response (decision box 302). If tones are recognized, test 304, analogous to tests 206 and 210, is performed. Test 304 checks for a calling card number, in which case standard automated Calling Card Service treatment is applied (action box 306), or one of the codes representing classes of operator assistance calls is recognized, in which case a transfer is executed to one of the subroutines O, C, K, P, T, S, M, or B. Finally, if following the reprompt announcement to the caller, a number is keyed which does not correspond to a legitimate code, the calling customer is connected to an operator (transfer to subroutine O, 400, FIG. 4). Similarly, if a flash is recognized while the customer is responding, a transfer is made to subroutine O to connect the calling customer to an operator. If speech is recognized, the speech is analyzed in decision box 314. The decisions for decision box 314 are the same as those for decision box 214 except that in this case, if after the reprompt announcement to the caller the speech data is still unrecognized, the calling customer is connected to an operator. Alternatively, at the choice of the switch owner, the call is terminated after failure. If the customer says nothing, does not key in a tone signal and does not flash, then action box 316 detects a timeout and the customer is connected to an operator.

The reprompt announcement routines of decision box 302 are invoked in large part because of the imperfect characteristics of automatic speech recognition. Whereas it is possible to detect tones with essentially 100 percent accuracy, it is not always possible to make a correct determination of a customer's spoken command. The use of a reprompt announcement and decision box 302 allows a second identification of the customer's command based on a new speech sample. It is possible that human factors tests may indicate that the reprompt announcement should state the suspected spoken term, if any. (For example, the announcement may say: "Did you request a collect call?") Recognition of some spoken command may be forced or a "no command recognized" state allowed.

Figure 4:
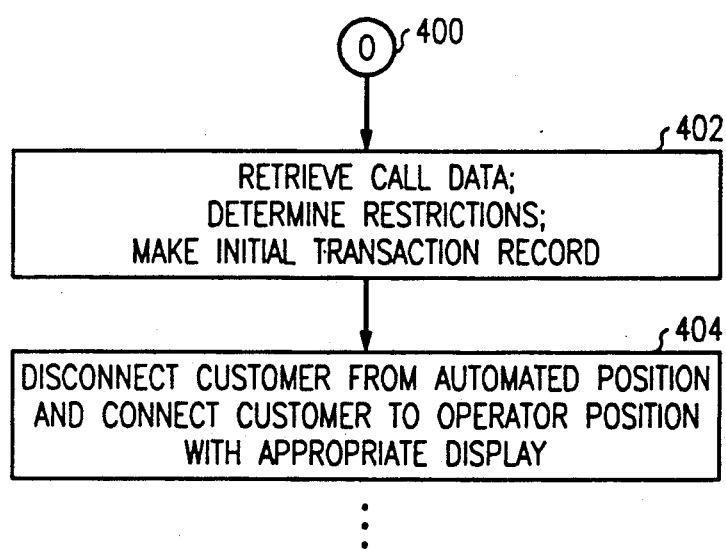

FIG. 4 indicates the actions to be carried out if the calling customer is to be connected to an operator. Subroutine O (400), first retrieves data about the calling number, the called number, and any other pertinent data about the status of the call so that the operator is fully informed and prepared to deal with the calling customer. Data about either party, but especially the called party, may be obtained from a remote data base system such as data base system 20 (FIG. 1). This data includes restrictions on either the calling or the called customer (for example, that the calling customer can only make collect calls or that the called customer will not, or, because it is a public coin station, cannot, accept any collect calls). Next, the calling customer is connected to the operator whose operator position has been initialized with that subset of the data retrieved in action box 402 (action box 404) which is pertinent to this type of call. The term "pertinent data" as used herein refers to that subset of accessed data which is pertinent to the call. Subsequently, the operator processes the call in a standard manner.

Figure 5:
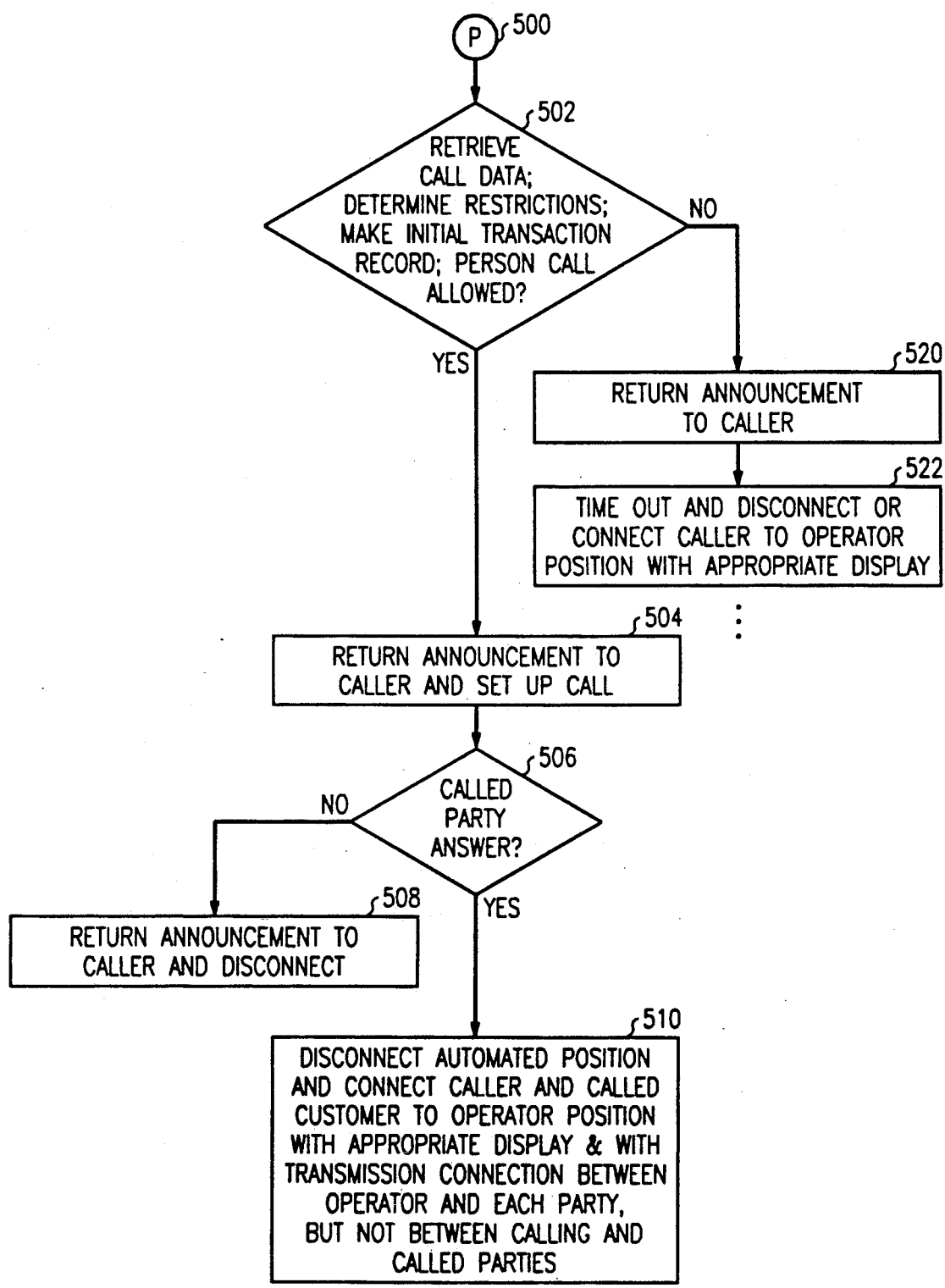

FIG. 5 represents subroutine P (500), the program used for controlling person-to-person calls. The first step (decision box 502) is to retrieve data concerning called and calling parties and determine if there are any restrictions on either party to make person-to-person calls or receive such calls. For example, many prisons allow their inmates to place only collect calls; the operator processing a person call needs to know of this restriction. If a person call is allowed, then an announcement is returned to the calling party (action box 504). This announcement will indicate to the calling customer that the call is being set up. In parallel with this announcement a connection is set up from switch 1 to the called customer. Test 506 determines whether the called customer answers. If the called customer does not answer within a predetermined interval, then an announcement is returned to the calling customer that nobody has answered and the call is disconnected (action box 508). If the calling customer disconnects before that predetermined interval, the call is similarly disconnected. If the called party answers, then the called party is connected through switching network 12 to an operator position which has been initialized with the pertinent data that has been collected for the person-to-person call (action box 510). The operator may then talk with either the calling or the called party, but under operator control the calling and called parties cannot talk to each other. Based on input received by the operator in talking to the two customers, the operator will either allow the call to be completed or will disconnect the call. It is desirable to connect person and collect calls in such a way that until billing is verified, the calling and called customers are not connected, and that for bill to third number calls, the calling and third number customers not be connected. This prevents unauthorized and unbillable communications between the calling and called or third number customers, as well as some more complex fraud schemes.

In setting up a person-to-person call in accordance with the methods described herein, it is important that an operator be attached quickly once the called customer picks up. While operator assistance calls are normally placed in an operator assistance request queue to handle calls in an orderly fashion based on time of arrival of the call, person-to-person calls processed as described herein may be placed in a special priority queue to reduce sharply the interval from the time that a called customer answers until an operator is attached to the call. As soon as the called customer answers, the call may be placed in the priority queue and an announcement may be connected to the called customer which states: "Please hold for a person-to-person call." As soon as an operator is available, that operator is connected to the calling customer in order to ascertain the identity of the desired called customer. The operator then requests a connection to the called customer and can talk to either the calling or the called customer without having the calling and called customers talk to each other. The operator ascertains whether or not the call should be completed and the call is either completed or disconnected in accordance with the operator's keyed request.

Note that the automated position could handle the functions of either or both of the MECH operators (referenced in the second paragraph of the Problem statement) according to the quality of the speech recognition equipment and the cost of the automated position, without changing the program of the operator assistance switch. The flexibility offered by an automated position which, effectively, mimics a limited set of operations of an operator position makes this possible.

If the calling customer is violating a restriction in attempting to place a person-to-person call (detected in decision box 502) an announcement is returned to the calling customer (action box 520). If the calling customer then hangs up, the call is simply disconnected. If the calling customer does not hang up within a predetermined interval, then, at the option of the telephone company, the calling customer can either be automatically disconnected or can be connected to an operator whose position will have been initialized with a display containing the pertinent data necessary to communicate with the caller about this call (action box 522).

Figure 6:
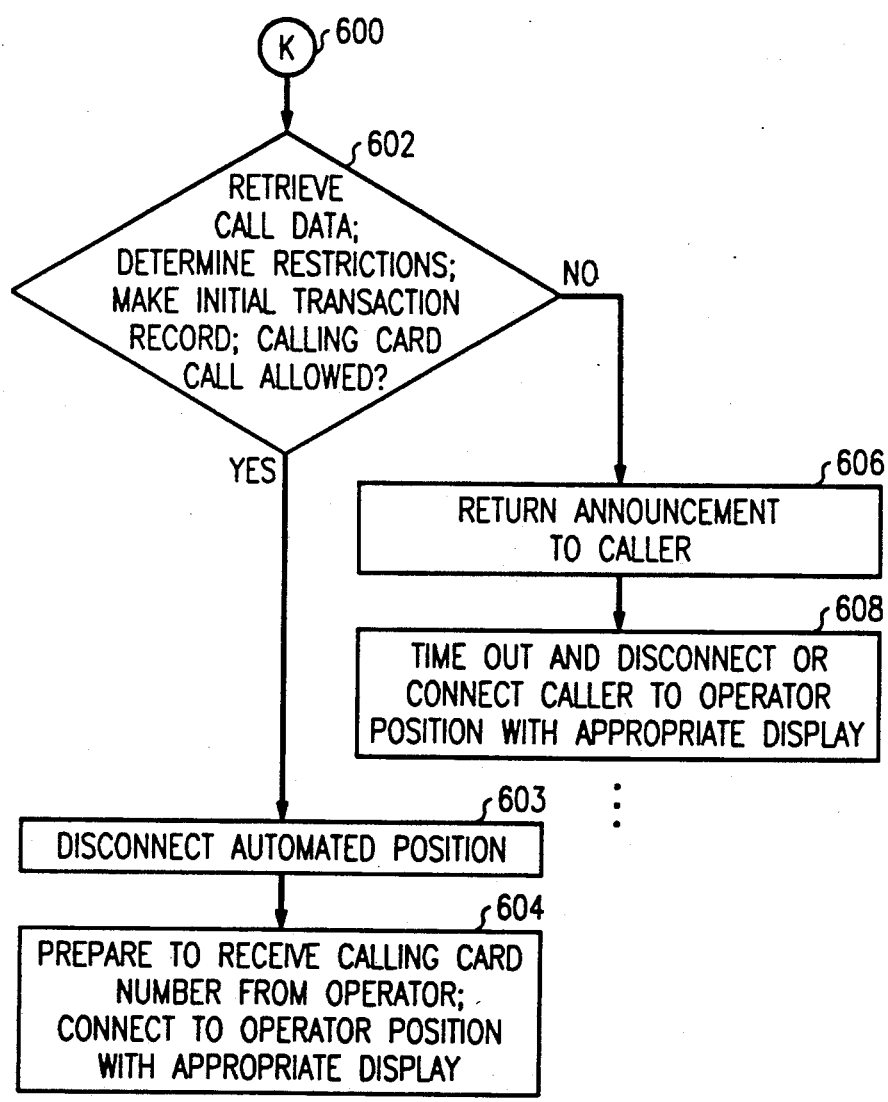
Figure 13:
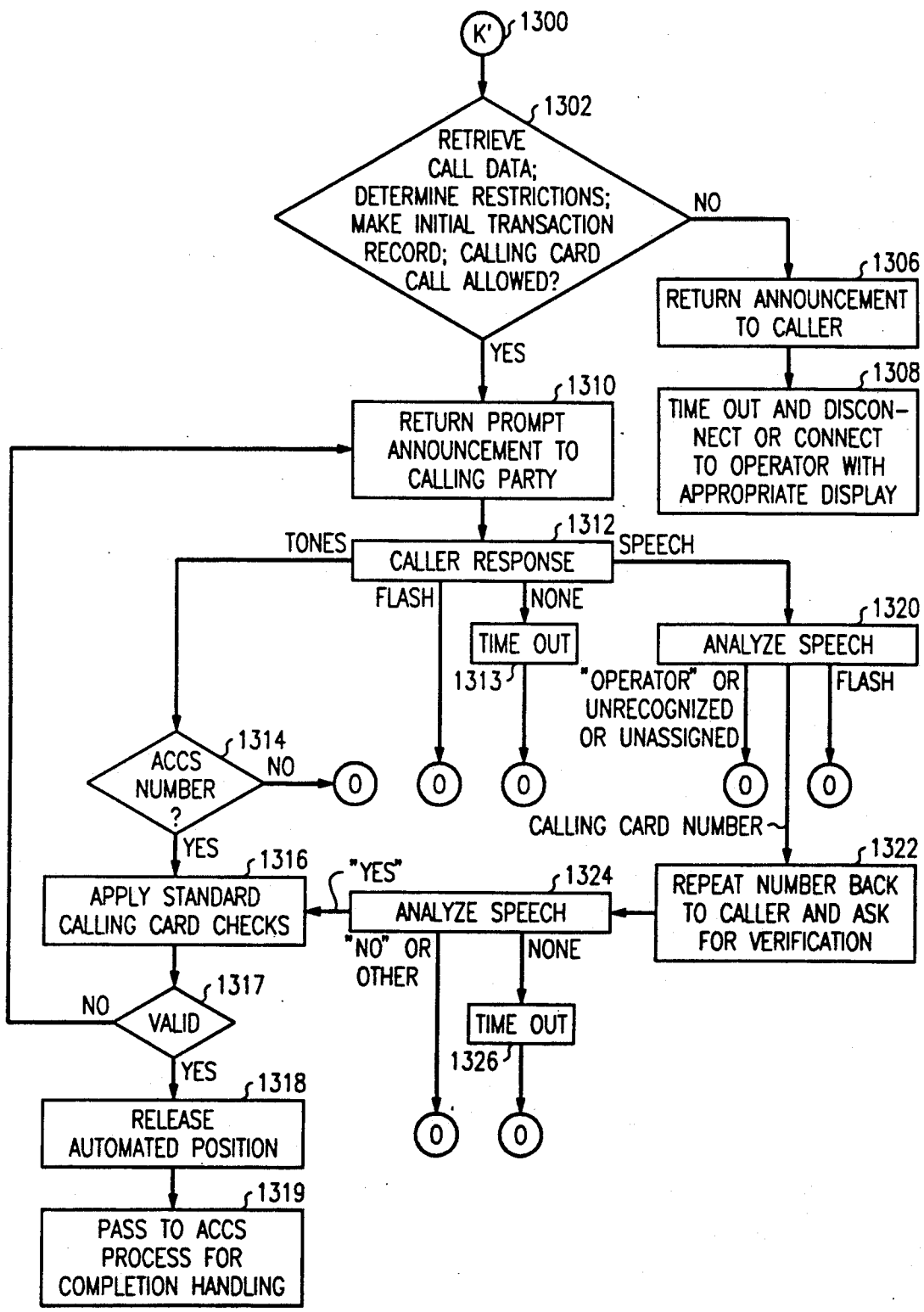

FIG. 6 is a flow diagram of subroutine K (600) for controlling certain calling card calls. Subroutine K of FIG. 6 is entered if the calling card customer is not calling from a DTMF terminal, but wishes to place a calling card call, or if the customer, for some other reason, wishes to speak instead of keying the calling card number. (An alternative version of subroutine K, namely, subroutine K' (1300), is shown in FIG. 13 and is described hereinafter.) Decision block 602 describes the initial actions carried out for such calls. The system retrieves data concerning the calling and called customer to see if there are any restrictions, and determines whether a calling card call is allowed. If a calling card call is allowed, then the control 10 is primed to receive a calling card number keyed in from the operator, i.e., to interpret numerical data keyed in by the operator as representing a calling card number. A connection is set up between the calling customer and the operator whose position has been initialized with a display indicating the characteristics of the call and additional pertinent data about the calling and called customers (action box 604).

If it is determined that a calling card call is not allowed, then an announcement is returned to the calling customer (action box 606). If the calling customer hangs up, the call is disconnected; otherwise, after a predetermined interval, the calling customer is either automatically disconnected or connected to an operator whose operator position has been initialized with the pertinent data (action box 608) so that the operator can explain to the customer what happened.

For serving calling card calls, it may be desirable to recognize "credit card" as well as "calling card" as a legitimate command. Many customers still use the term "credit card" when they refer to a telephone calling card.

Figure 7:
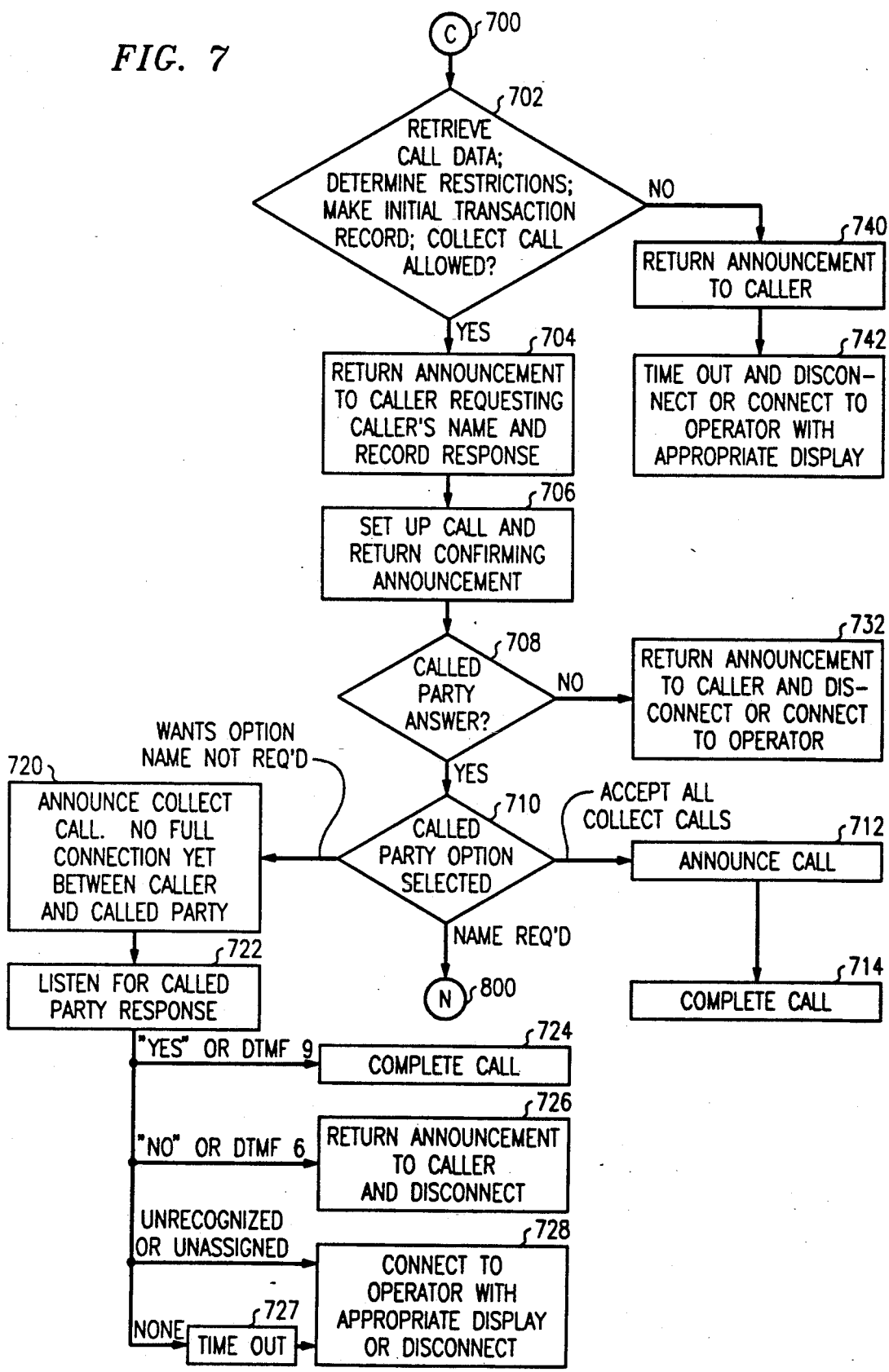

FIG. 7 is a flow diagram of subroutine C (700), the program used for processing collect calls. Initially, (decision block 702) the data for the calling and called customers is obtained in order to check for restrictions. In this case, the restrictions tend to be dependent on the called customer as described with respect to the example call. An initial record is made using transaction recorder 22. If collect calls are allowed then an announcement is connected to the calling customer. This announcement requests the calling customer to speak his/her name so that the name can be recorded for possible subsequent transmission to the called customer (action box 704). The call is then set up and an announcement confirming reception of the calling customer's name response is returned to the calling customer (action box 706). Test 708 checks whether the called party answers before a predetermined interval has elapsed. Then test 710 is performed to select among the options of the called party. If the called party accepts all collect calls, then optionally an announcement is connected to the called party to announce that a collect call is being set up to the called customer (action box 712) and the call is completed (action box 714). If the called customer wants to make a decision on every call as to whether or not she/he will accept the call but does not require the name of the calling customer, then the called customer is connected to an announcement (action box 720). The announcement might announce a message such as: "You have a collect call, will you accept charges, yes or no". The voice processing unit which has already been used for making the announcement is then primed to listen for a called party response (decision box 722). If the called party responds a "yes", either verbally or by keying, say, a 9 (=Y for "yes"), recognized by the automated position, then the call is completed (action box 724). If the called customer announces "no", either verbally or by keying a 6 (=N for "no") recognized by the automated position or by disconnecting, then an announcement is returned to the calling customer and the call is disconnected (action box 726). If the automated position either does not recognize the called customer's response, or recognizes it but recognizes it as not being either yes or no, or if no response is made by the called customer within a predetermined interval (timeout, action box 727), then both the calling and the called customers are connected to an operator position which has been initialized with a display indicating the status of the call and the pertinent data, in such a way that either the calling or the called customer can talk to the operator, but that the calling and called customers cannot talk to each other. The operator may then take appropriate action to either disconnect the call or to let the call complete with appropriate charging (action box 728). If the called party has selected the name required option, a transfer is made to subroutine N (800) described with respect to FIG. 8.

If the called customer does not answer within the predetermined interval, then an announcement is returned to the calling party indicating that there was no answer and the call is disconnected (action box 732); alternatively the calling customer may be connected to an operator in this case. If no collect call is allowed to this called customer, for example, if the called customer terminal is a public coin station, then an announcement is returned to the calling customer (action box 740) and if the calling customer fails to disconnect within a predetermined interval, the calling customer is either automatically disconnected or connected to an operator whose display indicates the status of the call and pertinent data (action box 742).

Using this arrangement, it is also possible to implement a service similar to present "Enterprise" service, a type of "automatic" collect call, without requiring the use of an operator. The data base for the called customer indicates for which originating area plus office codes the called customer will accept collect calls. Calls from one of these area plus office codes are then automatically accepted.

Part of the reason for making an initial transaction record as one of the first steps of subroutine C (700) is to allow for possible attempt charges for collect calls not completed because of a restriction or decision by a called customer.

Figure 8:
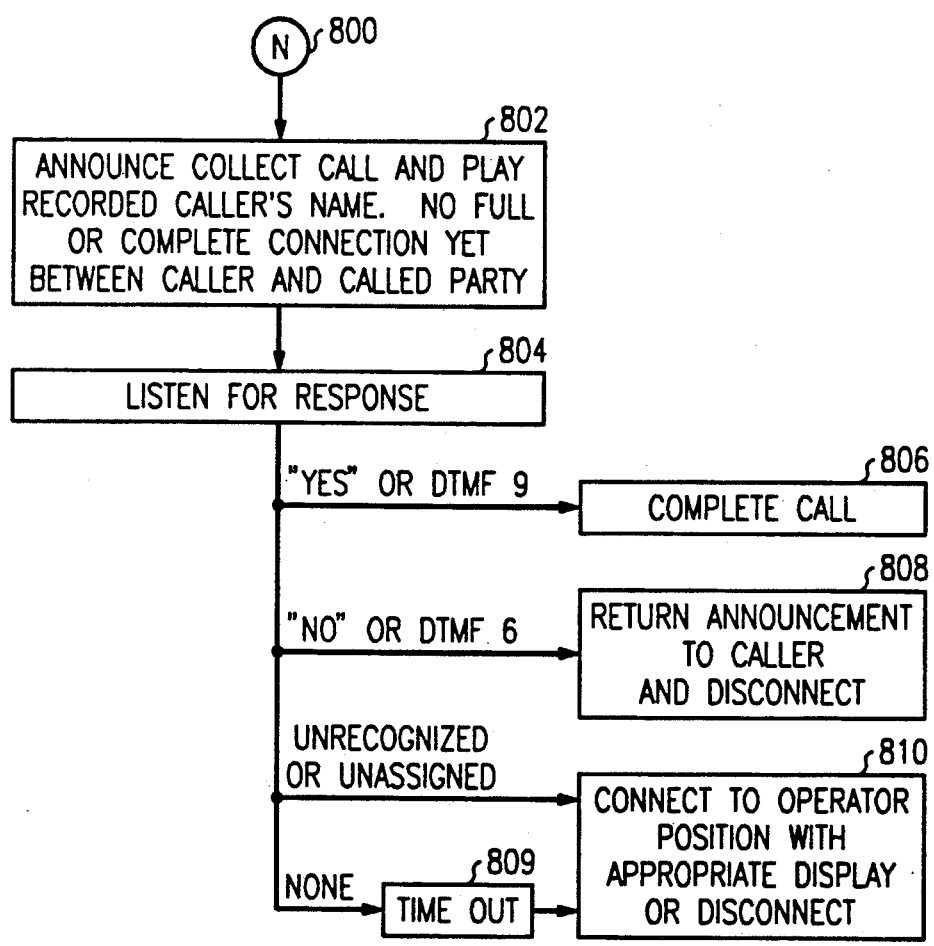

FIG. 8 is a flow diagram of subroutine N used to control collect calls where the called customer has requested that collect calls be announced including the calling customer's name. The announcement of the collect call, in this case, will also include the caller's name previously recorded in action box 704 of FIG. 7 (action box 802). The automated position is then primed to listen for the called customer's response (decision box 804). If the response is recognized as "yes" or keyed 9, the call is completed (action box 806). If the response is recognized as "no" or keyed 6, then the previously cited announcement is returned to the calling customer and the call is disconnected (action box 808). Finally, if the response of the called customer is either unrecognized or represents an unassigned phrase (i.e., neither yes nor no) or if no response is detected within a predetermined interval (timeout, action box 809), then the calling and called customers are both connected (action box 810) to an operator position which is initialized with a display indicating the status of the call and pertinent data retrieved in decision block 702 (FIG. 7). The operator can then make a decision as to whether to complete the call or disconnect the parties. As in the case of action box 728, the called and calling parties cannot talk to each other while both are connected to the operator position.

Figure 9:
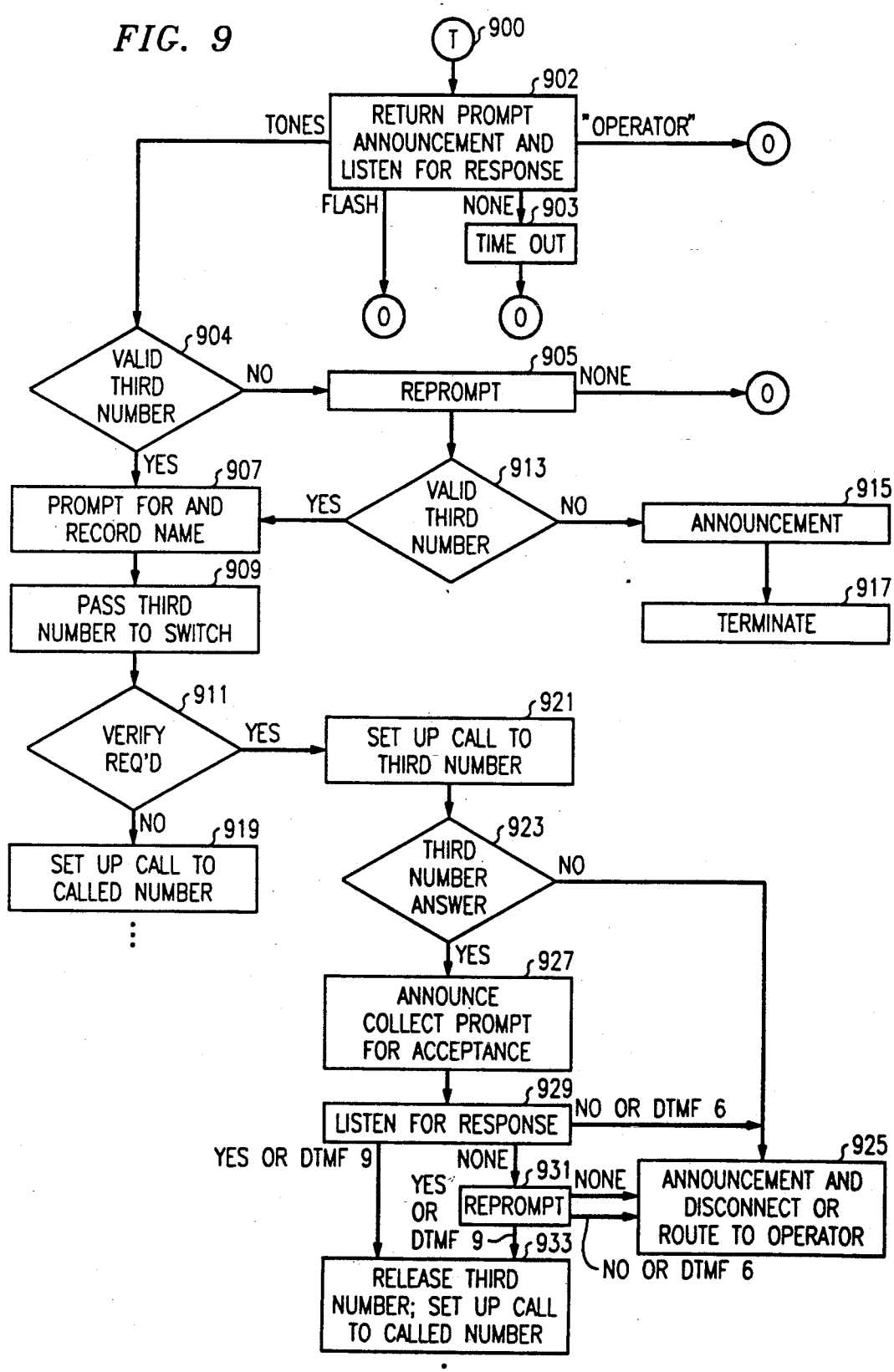

FIG. 9 is a flow chart of subroutine T (900) for controlling calls to be billed to a third party. A prompt announcement is returned from the automated position which then listens for a response (action block 902). If the response is "operator" then routine O is entered. If the customer flashes, routine O is entered. If there is a timeout (action block 903) then routine O is entered. Finally, if tones are detected, these are accumulated and tested to see if they represent a valid third number (test 904). If not, the customer is given a reprompt (action block 905) requesting that the third number be keyed. If, in response to this, the customer flashes, times out, or says "operator", then the routine O is entered. If the customer keys a number, this number is tested to check if it is a valid third number (test 913). If not, an announcement is played to the customer from the automated position (action block 915) and the call is disconnected (action block 917). If a valid third number has been recognized in test 913 or in test 904, then the customer is prompted to announce his or her name (action block 907). This is recorded. The third number keyed by the customer is sent as a data message to switch control 10 (action block 909). Switch control 10 then determines whether a verification of the request to charge that number is required (test 911). If no verification is required, the call is set up to the called number (action block 919) under the control 10 of switch 1 and the automated position is disconnected. If verification is required, the connection is set up to the third number (action block 921). Test 923 determines whether the third number answers. If not, then an announcement is returned from the automated position and the call is disconnected or, according to the option of the operating telephone company, the call is set up to an operator position (action block 925). If the third number does answer, then the type of call is announced and the third party is prompted to speak or key an acceptance (action block 927). The automated position listens for a response from the third party (action block 929). If no response is forthcoming, then the actions previously described for action block 925 are carried out. If the third party responds with a "yes" or keys DTMF 9, then the third number is released and the call is set up to the called number and the automated position is disconnected (action block 933). If the third party responds "no" or keys a DTMF 6, then the actions previously described with respect to action block 925 are carried out. If the third party does not respond, a reprompt is given from the automated position (action block 931). If, in response to the reprompt, the third number answers "yes" or keys in DTMF 9, then the call is set up as previously described with respect to action block 933. If, in response to the reprompt, the third number replies "no" or keys DTMF 6, or does not reply, then the actions previously described with respect to action block 925 are carried out.

Figure 10:
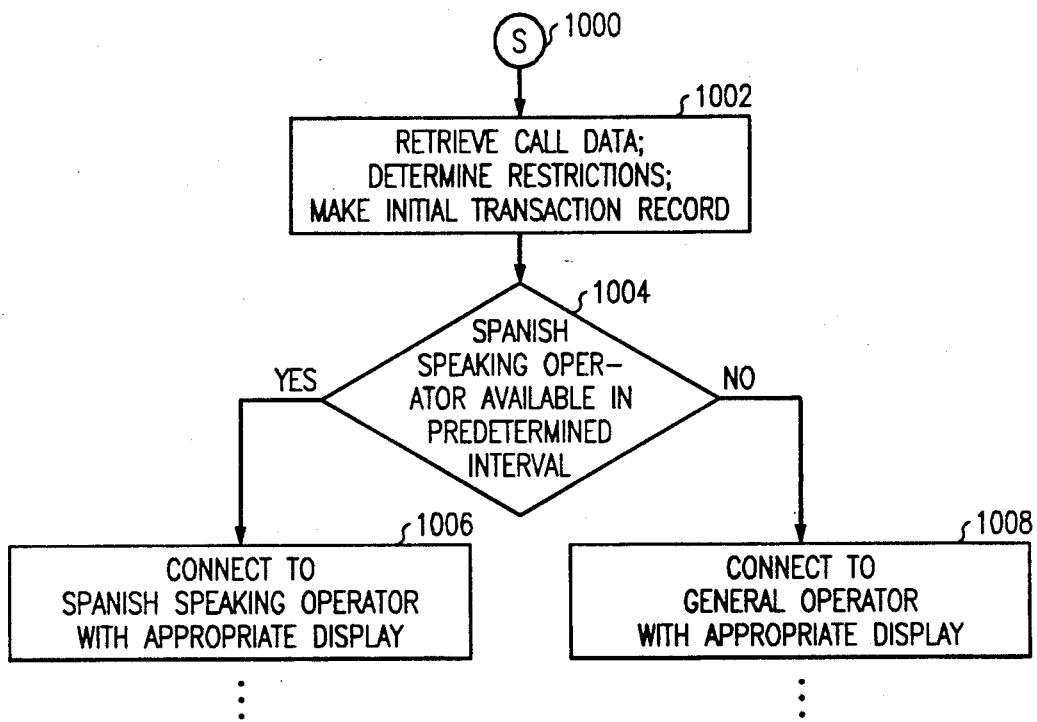
Figure 11:
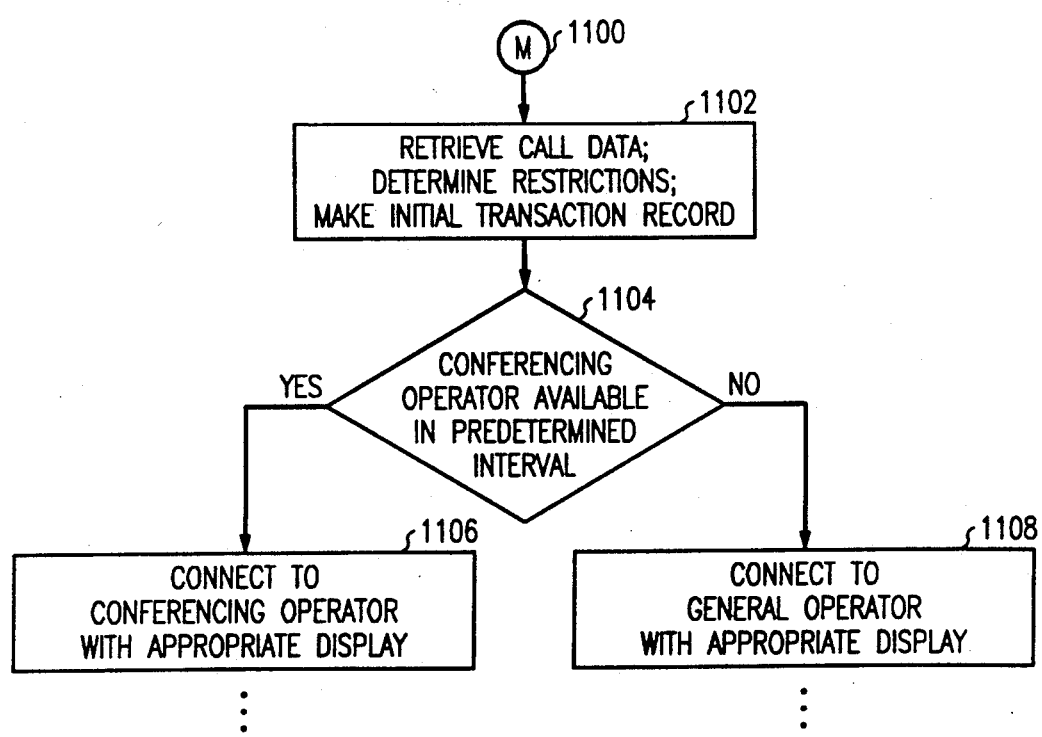
Figure 12:
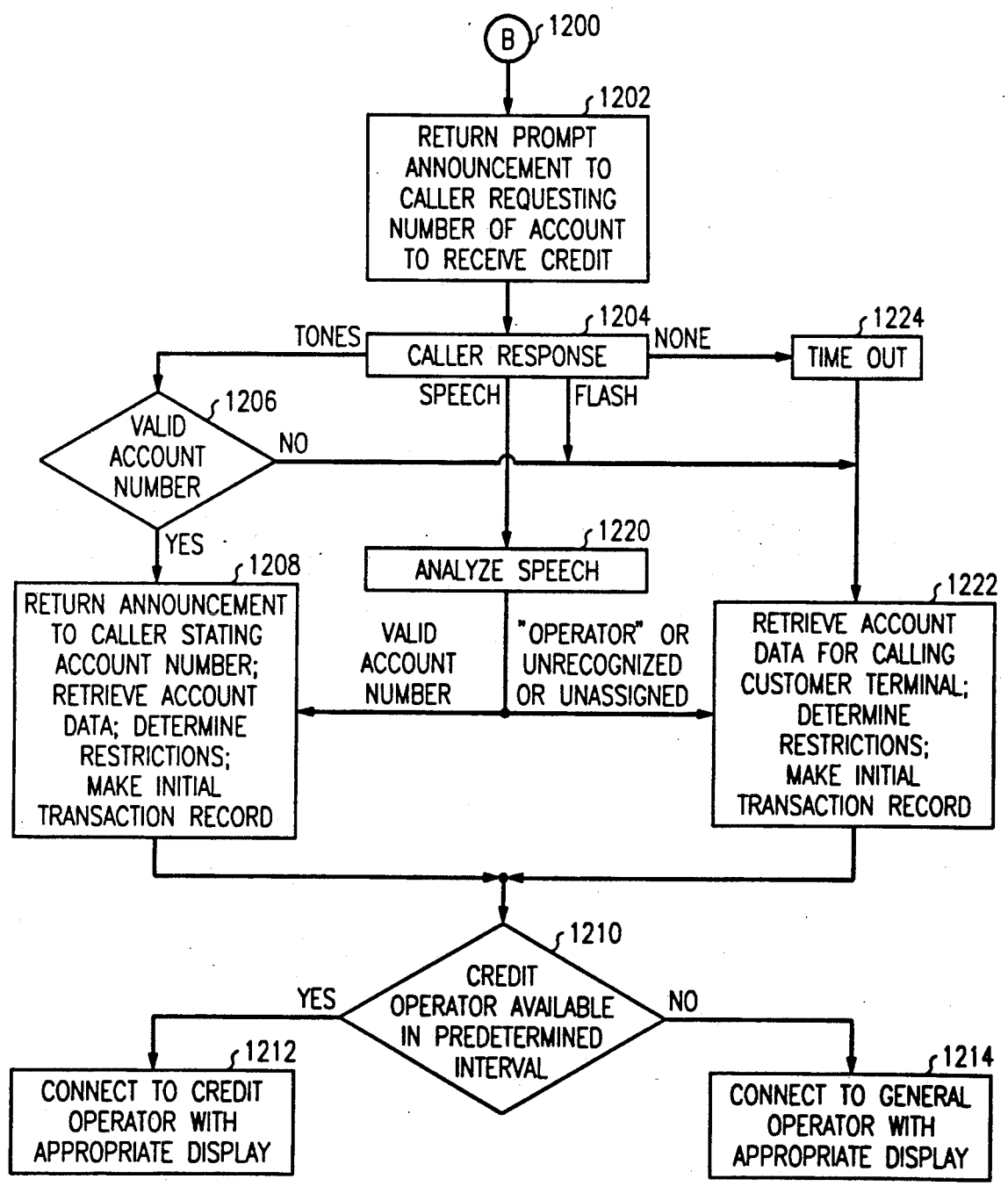

FIGS. 10–12 deal with calls requiring the use of special operator teams. Three types of special operator teams are described herein: a Spanish-speaking team for handling operator assistance calls from customers who prefer to use Spanish in their communication with telephone operators, a second team for setting up conference calls, and a third team associated with a customer credit and service bureau for handling customer inquiries on billing and for handling requests for refunds. Other specialized teams such as teams speaking languages other than English and Spanish could also be used for handling special categories of calls. Furthermore, it may be desirable to have operator teams which specialize in particular classes of operator assistance calls such as a team which specializes in person-to-person calls. The use of access codes keyed by customers with DTMF terminals, or spoken commands, can be used to route calls to an appropriate team. In order to utilize operators most efficiently, it may also be desirable to have traffic flow between teams where there is a temporary overload on one of the teams.

FIG. 10 is a flow diagram for subroutine S (1000) for responding to a spoken or keyed request for a Spanish-speaking operator. The system first retrieves the call data for the originating customer and data associated with the called number in order to prepare to set up an initial display for the operator who will handle this call. In addition, an initial transaction record is made in order to prepare for future billing of this call (action box 1002). Next, a test is made (decision box 1004) of whether a Spanish-speaking operator (i.e., an operator on the specialized Spanish-speaking team) will be available within a predetermined interval. If so, then the customer is connected to a Spanish-speaking operator (i.e., a member of the specialized Spanish-speaking operator team) whose operator position has been initialized with the display of pertinent data generated by the control of switch 1 (action box 1006). Thereafter, the call is processed in essentially the same way as calls to the general operator (as described with respect to FIG. 4). If no Spanish-speaking operator is available within the predetermined interval, as indicated by the length of the queue of requests for a Spanish-speaking operator, then the call is connected to a general operator whose position will be initialized with the appropriate display of pertinent data (action box 1008). This general operator will then handle the call in the same way as other general operator assistance calls.

FIG. 11 is a flow diagram of subroutine M (1100) which is entered when a customer either dials the access code for a conference call operator or when the customer speaks the word "conference". FIG. 11 is very similar to FIG. 10 except for the fact that the conference operators have access to special facilities not available to members of some other operator teams for setting up multi-party conference calls. Initially, the system retrieves the account data for the calling customer and, if the calling customer has already dialed at least one number of a multi-party conference call, then establishes a connection for any such called customers on this call. The system then makes an initial transaction record for subsequent billing processing (action box 1102). Next, decision block 1104 shows a test to see whether a conference operator will be available within a predetermined interval. This test is based on the length of the queue for conference operator requests. If a conference operator will be available within a predetermined interval, then as soon as a conference operator is available the calling customer will be connected to a conference operator; the operator position will be initialized with the display of pertinent data gathered by the control of switch 1 (action box 1106). Otherwise, if no conference operator is available within the predetermined interval, the calling customer will be connected to a general operator whose operator position will be initialized with the appropriate display of pertinent data (action box 1108).

FIG. 12 is a flow diagram of subroutine B (1200) entered when the code for a request for an operator from the customer credit and service bureau has been keyed by a customer with a DTMF terminal or the word "billing" has been spoken by a customer. In order to reduce the work time of an operator from this bureau, a prompt announcement is returned to the calling customer requesting the number of the account to receive credit. This number, in general, is the customer's directory number, but may also be a third number which is to receive credit in case the customer query is with respect to a bill to third number call, or may be a calling card number (action box 1202).

In response to the prompt announcement, the customer who is connected to an automated position (action block 200) may key in a number if he has a DTMF terminal, may speak a response, may flash, or may do nothing. Test 1204 determines which of these actions has been taken by the customer. If the customer keys in a number, test 1206 is used to determine whether the number is a valid account number. If the number keyed in is a valid account number, then an announcement is returned to the caller stating the account number to allow the customer, to verify that the proper account is being handled, and data is retrieved from the data base of the customer credit and service bureau (action box 1208). One way that this data could be retrieved is if the data were located in a remote data base such as data base 20, accessed via data network 18 (FIG. 1). From the retrieved data the restrictions on the calling customer are determined and the system then makes an initial transaction record of this call (action box 1208). This initial transaction record is available for possible use in generating traffic data, and, as an initial record for possible use in conjunction with additional information, to provide appropriate credit to the proper account. Such initial records may also be useful to identify customers who generate excessive numbers of billing requests. The initial transaction record may also contain data which can be useful for subsequent analysis in order to identify possible sources of fraud.

At this point, the system is ready to connect a credit operator and in test 1210 a determination is made whether a credit operator will be available within a predetermined interval. If a credit operator (i.e., an operator from the customer credit and service bureau) is available, a connection is set up from the calling customer to the credit operator; the credit operator position is initialized with a display of the pertinent data gathered by the system (action box 1212). If no credit operator will be available within the predetermined interval, the customer is connected to a general operator whose operator position will be initialized with the appropriate display of pertinent data (action box 1214).

Returning now to test 1204 which checks on the response of the calling customer to the prompt announcement, if the calling customer's response is a spoken message, this message is analyzed (decision box 1220). If the message consists of a series of numbers representing a valid account number, then action box 1208 is entered in order to return an announcement to the customer stating the account number, to retrieve account data, and determine restrictions and make an initial record as previously described. If the customer's message consists of the word "operator", then the system retrieves the account data for the calling customer terminal, determines the calling customer restrictions and makes an initial transaction record (action box 1222). At this point, the system is ready to set up a connection to a credit operator by entering test 1210 for credit operator availability as previously described.

The action box 1222 is also entered if the customer's speech is not recognized by the system as representing an account number, in the same way as if the customer had spoken the word "operator". Also, if the account number spoken by the customer or keyed by the customer is not valid, then, action box 1222 is similarly entered. Finally, if the response to the prompt announcement as determined by decision block 1204 is either a flash or the customer fails to respond within a predetermined interval as detected by time out block 1224, action box 1222 is similarly entered.

Note that the facilities of the voice processing unit are used extensively in this subroutine to minimize the amount of data which is transmitted verbally from the calling customer directly to the credit operator; as a result, the work time of the credit operator is substantially reduced.

FIG. 13 is a flow diagram of an alternate method of handling calling card calls by customers who have not keyed in their calling card number. In the alternate method of FIG. 13, represented by subroutine K' (1300), spoken calling card numbers are recognized. The initial step (action box 1302) for subroutine 1300 is the same as the initial step (action box 602) for subroutine 600. Further, if it is determined that no calling card call is allowed, the actions represented by action box 1306 and 1308 are the same as the action boxes 606 and 608 of subroutine K (600). However, if a decision is made that a calling card call is allowed, then a prompt announcement is returned to the caller (action box 1310). The caller response is analyzed (decision box 1312). If the caller has keyed tones, test 1314 determines whether these tones represent a calling card number: if not, the customer is connected to an operator; if so, standard automated Calling Card Service treatment (action box 1316) is accorded to the calling customer. If the caller's response to the prompt announcement is either a flash or no response within a predetermined interval (timeout, action box 1313), then subroutine O is entered and the caller is connected to an operator. If the caller speaks, this speech is analyzed in decision box 1320. If the speech is interrupted by a flash or the customer's response is anything else other than a calling card number, or if the customer does not respond within a predetermined interval, subroutine O is entered and the calling customer is connected to an operator. If the calling customer speaks a calling card number, this number is repeated back to the caller (action box 1322) along with a request that the caller verify the calling card number. The caller's response is analyzed in decision box 1324. If the response is recognized as "yes", then standard automated Calling Card Service treatment is provided for this call (action box 1316). If a "no" is recognized or any other speech is recognized, or if there is no response within a predetermined interval (timeout, action box 1326), a transfer is made to subroutine O and the customer is connected to an operator. If experience indicates that it is not necessary to repeat calling card numbers to the calling customer, this step can be bypassed at the option of the telephone company. This is entirely possible since all calling card numbers are verified and it is unlikely that recognition errors would result in a valid calling card number.

Note that in all of the sequences described above, a customer is connected to an operator if a customer having a DTMF terminal keys a 0, if a calling customer flashes, or if the automatic speech recognition system fails to recognize an appropriate expression after appropriate reprompt tones or announcements.

While this description has been in terms of having customers key longer sequences of digits such as calling card numbers or third numbers, it is also possible to have customers, especially those calling from rotary dial stations, speak the numbers and to use the automated position to recognize the spoken numbers. The sequences following the recognition of a series of spoken numbers are essentially the same as the sequences following the recognition of a series of DTMF signals. The invention described herein may be readily updated to incorporate improved speech recognition technology to recognize long strings of digits as such technology becomes available.

Figure 14:
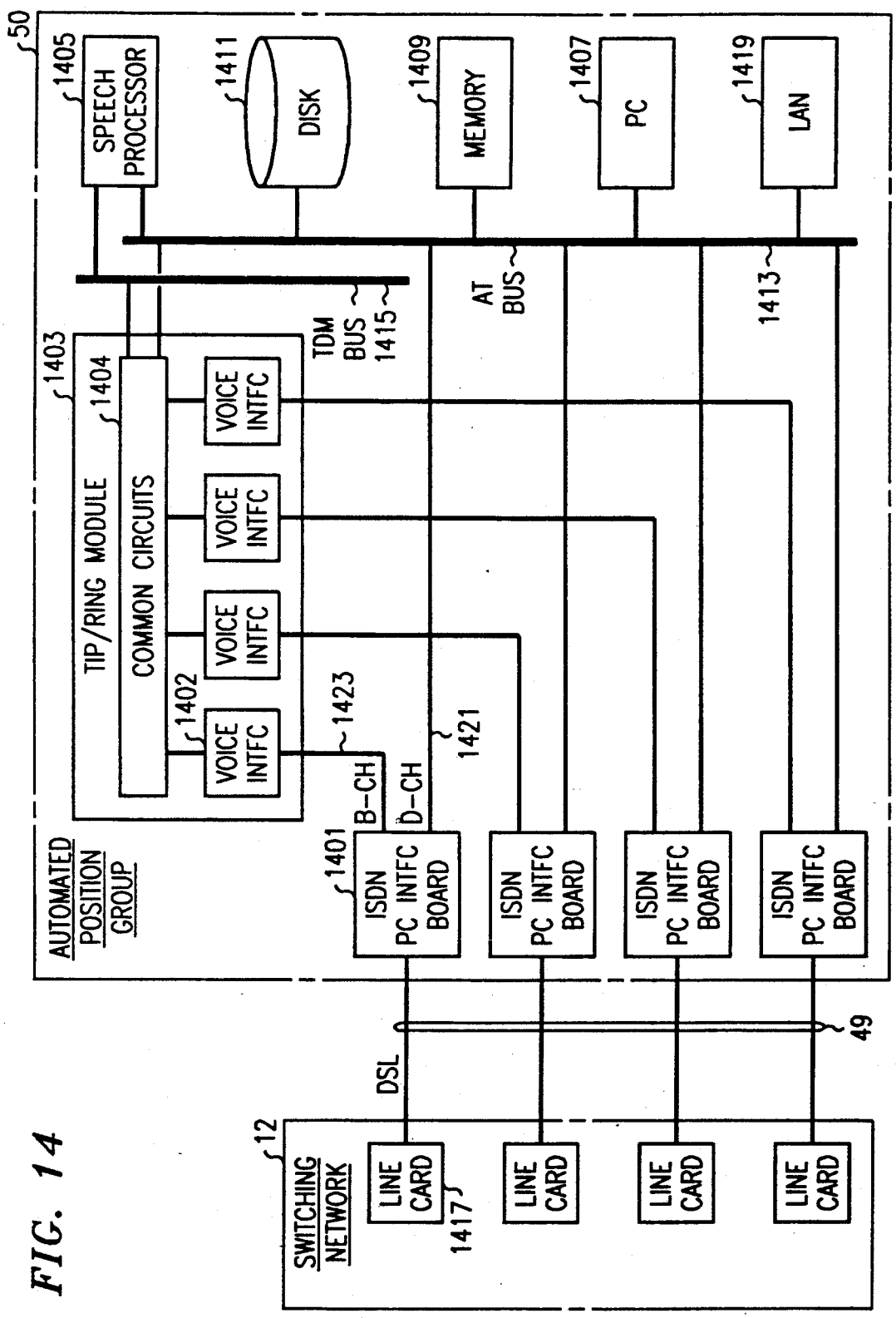
FIG. 14 is a block diagram of an automated position group.

FIG. 14 is a block diagram of an automated position group 50. The automated position group is connected via four ISDN digital subscriber lines grouped into entity 49 to corresponding ISDN T-interface line cards 1417 in switching network 12 of the operator assistance switch. Each of these digital subscriber lines is terminated to an ISDN Personal computer Interface Board (IPIB) 1401. This personal computer interface board 1401 has as outputs both a D-channel output 1421 for conveying data messages between the switching network and the control equipment of the automated position group and a voice-channel output 1423 for communicating with an automated position TIP/RING (T/R) interface module 1403. The interface module 1403 includes common circuits 1404 for interfacing to the time division multiplex bus 1415 and to four individual voice interface circuits 1402 for interfacing with the B-channels of the four ISDN interface boards 1401. The T/R interface module 1403 reconverts the analog voice-channel output of the IPIB to a digital signal; provides a line-equivalent balancing network (in contrast to the IPIB which provides an operator position equivalent balancing network,; and provides the equivalent of DTMF receivers for detecting DTMF. The B-channel carries voice signals and DTMF tones from the calling or called customers connected to the line card 1417. The TIP/RING interface module 1403 conveys voice signals to time division multiplex bus 1415 for communication to the speech processing board 1405. The speech processing (SP) board processes speech signals and communicates with personal computer 1407 over an Advanced Technology (a common PC state of the art) bus 1413. The SP provides announcements and prompts, and receives spoken input which it processes to recognize the words of that input. It is also used for recording a spoken name (for example, for collect calls) and applies speech recognition grammar rules. Bus 1413 is a 32 bit PC bus for communicating among the blocks connected thereto. Local Area Network (LAN) interface 1419 is used to control bus 1413. The speech processor board identifies the spoken input and passes this data to PC 1407 which applies additional grammar checks using a software data interface process. Memory 1409 is a PC expansion memory, a random access memory (RAM) to provide adequate RAM for the PC. The disk 1411 is a standard PC disk used for storing system software, drivers, program, office data, and digitized announcement and prompting phrases. The PC communicates data messages over one of the D-channels 1421 to one of the line cards 1417 and receives messages from the operator assistance switch over the same D-channel. A particular call is associated with a particular D-channel and line card while being served. The messages that are exchanged over this D-channel are exactly the same messages as are used in communicating with an operator position staffed by a human being and used for controlling the display of that operator position and for sending data representing information keyed by the operator to the operator assistance switch.

The above description is considered to be only an illustrative embodiment of the invention. Other alternatives are possible without departing from the scope of the invention. For example, a service to the handicapped may be offered by asking them to speak an identifying command followed by a spoken directory number to allow them to set up standard, normally dialed, calls. Further, it is possible to have many different tradeoffs between what is recognized by automatic voice processing techniques and what is recognized only by use of an operator. Prompting tones and prompting announcements can be selected based on experience in human factors tests and can be changed as customers become more sophisticated. It is to be understood that various and numerous other arrangements may be devised by one skilled in the art without departing from the scope of the invention. The invention is thus limited only as defined in the accompanying claims.

We claim:

1. In a telecommunications system, comprising a switching system having a switching network with a plurality of ports each for connection to an operator position, a method for serving a call whose destination is specified by dialed signals from a caller, comprising:
   in automated equipment connected to one of said ports, comprising speech recognition equipment, analyzing speech signals from a caller received via said network to identify a class of said call;
   responsive to the class identification, sending a switching network request message from said automated equipment to said switching system for requesting connection of said call to a call destination, wherein said system is further connectable to an attended operator position and wherein said request message is essentially the same as a corresponding request message transmitted from an attended operator position.

2. The method of claim 1 further comprising:
   establishing said requested connection to a called terminal at said destination; and
   monitoring said requested connection for detecting an answer signal.

3. The method of claim 2, wherein said automated equipment comprises means for announcing messages further comprising:
   responsive to detecting said answer signal, announcing from said automated equipment to said called terminal a request to issue a prespecified command; and
   responsive to detecting said prespecified command from said called terminal, transmitting another request message to said switching system to request a connection between a terminal serving said caller and said called terminal.

4. The method of claim 3 further comprising:
responsive to detecting another command from said called terminal, transmitting a request to said switching system to connect said called terminal to one of said at least one attended operator position.

5. The method of claim 3 wherein said command is a speech command.

6. The method of claim 3 wherein said automated equipment is further adapted to detect dual tone multi-frequency (DTMF) signals and said command is a DTMF signal.

7. The method of claim 1 further comprising the step of:
preceding said analyzing step, prompting, from said automated equipment, said caller to issue a command.

8. The method of claim 1 further comprising:
monitoring performance of said automated equipment by bridging an operator to incoming voice signals to said automated position; and
displaying message data at said automated equipment in a format essentially similar to a format for display of said message data at an operator position.

9. In a telecommunications system, comprising a switching system having a switching network with a plurality of ports each for connection to an operator position, for offering operator assistance services, a method of setting up a collect call comprising the steps of:
connecting a calling customer terminal to an automated position means connected to one of said ports for processing calls, said automated position means comprising an automated voice processing system, in response to a receipt of signals from said calling customer terminal comprising a directory number of a called customer terminal and an indication that said call is an operator assistance call;
analyzing a voice command received from said calling customer terminal by said automated voice processing system to identify said call as a collect call;
responsive to said identifying, transmitting a request from said position means to said switching system to establish a connection to said called customer terminal, said request being essentially the same as a corresponding request from an attended operator position;
recording in said voice processing system a response to a prompting of said calling customer to speak a name;
detecting an answer by said called customer terminal;
announcing a message to said called customer terminal, said message comprising said recorded response;
in said voice processing system, detecting a positive command, given in response to said message, from said called customer terminal; and
responsive to detecting said positive command, completing a connection from said calling customer terminal to said called customer terminal.

10. The method of claim 9 further comprising the step of:
following said connecting step, and prior to said analyzing step, prompting, from said position means, a calling customer at said calling customer terminal to speak a command.

11. In a telecommunications system, comprising a switching system having a plurality of ports each for connection to an operator position, for offering operator assistance services, said switching system connectable to operator positions organized into a plurality of operator position teams, a method of serving operator assistance calls, comprising the steps of:
connecting a calling customer terminal to automated position means connected to one of said ports for processing assistance calls, said automated position means comprising automated voice processing means for processing speech input and generating speech output, in response to a receipt of signals from said calling customer terminal comprising an indication that said call is an operator assistance call and a directory number of a called customer terminal;
in said automated position means, analyzing a voice command received from said calling customer terminal by said automated voice processing means to identify a class of said call; and
transmitting from said automated position means a request to said switching system for connecting said calling customer terminal to an operator position of one of said plurality of operator teams, said request being essentially the same as a corresponding request from an attended operator position, said one of said plurality being selected in data of said request according to said class identified in said analyzing step.

12. The method of claim 11 wherein one of said operator position teams is a team staffed with foreign language speaking operators, and said analyzing step comprises the step of analyzing said voice command by said automated voice processing means to identify an operator assistance call whose class is service from a foreign language speaking operator.

13. The method of claim 11 wherein one of said operator position teams is a team for establishing conference calls, and said analyzing step comprises the step of analyzing said voice command by said automated voice processing means to identify an operator assistance call whose class is conference call service.

14. The method of claim 11 wherein one of said operator position teams is a team for handling billing requests and said analyzing step comprises the step of analyzing said voice command by said automated voice processing means to identify an operator assistance call whose class is billing operator service.

15. The method of claim 11 further comprising the step of:
following said step of connecting to said automated position means and prior to said analyzing, prompting a calling customer at said calling customer terminal to speak a command.

16. In a telecommunications system, comprising a switching system having a plurality of ports each for connection to an operator position, for offering operator assistance services, a method of setting up a bill to third number call comprising the steps of:
connecting a calling customer terminal to automated position means connected to one of said ports for processing assistance calls, said automated position means comprising automated voice processing means for processing speech input and generating speech output, in response to a receipt of signals from said calling customer terminal comprising a directory number of a called customer terminal and an indication that said call is an operator assistance call;

in said automated position means analyzing a first voice command received from said calling customer terminal by said automated voice processing means to identify a class of said call as a bill to third number call;

in said automated position means receiving a second voice command from said calling customer terminal corresponding to a third number to be billed for said call;

in said automated position means analyzing said second voice command to identify said third number to be billed for this call;

from said automated position means prompting said calling customer to speak a name and recording a response to said prompting;

from said automated position means, transmitting a request to said switching system to establish a connection to a customer terminal for said third number, said request being essentially the same as a corresponding request from an attended operator position;

setting up a connection from said switching system to said customer terminal for said third number;

detecting an answer by said customer terminal for said third number;

from said automated position means, announcing a message to said customer terminal for said third number, said message comprising said response;

in said automated position means detecting a positive command given in response to said message from said customer terminal for said third number; and responsive to detecting said positive command, completing a connection from said calling customer terminal to said called customer terminal.

17. In a telecommunications system, comprising a switching system having a plurality of ports each for connection to an operator position, for offering operator assistance services, said switching system having controller means for controlling establishment of calls, a method of setting up a calling card call comprising the steps of:

connecting a call from a calling customer terminal to automated position means for processing assistance calls, said automated position means comprising automated voice processing means for processing speech input and generating speech output, in response to a receipt of signals from said calling customer terminal comprising an indication that said call is an operator assistance call and a directory number of a called customer terminal;

in said automated position means, analyzing a first voice command received from said calling customer terminal by said automated voice processing means to identify a class of said call as a calling card class;

in said automated position means, receiving a second voice command corresponding to a calling card number from said calling customer terminal;

in said automated position means, analyzing said second voice command to identify said calling card number; and transmitting a message comprising an identity of said calling card number for verifying validity of said calling card number from said automated position means to said controller means, said message being essentially the same as a corresponding message from an attended operator position.

18. Automated position means for connection to a telecommunications switching system having a switching network, said network having a plurality of inputs for connection to an interconnection network, for connection to customer terminals, and for connection to a plurality of automated position means and attended operator positions, each of said position means comprising:

voice processing means for analyzing a received voice input signal receivable from said switching network and generating a corresponding data output signal; and control means responsive to said corresponding data output signal for transmitting a control message to request establishment of a connection through said switching network, said message being essentially the same as a corresponding message from an attended operator position.

19. The automated position means of claim 18, wherein said switching system is further connected to at least one attended operator position and wherein said control means comprises means responsive to a data signal from said switching system for detecting an answer signal subsequently received from a called customer terminal; and wherein said control means is responsive to said detecting of said answer signal for selectively transmitting messages to said switching system for establishing a connection between a source of said voice input signal and one of said at least one attended operator positions.

20. The automated position means of claim 18, wherein said voice processing means further comprises means for analyzing tones keyed from a customer terminal and wherein said voice processing means is further responsive to a sequence of tones keyed from one of said customer inputs for generating a corresponding other data output signal, and wherein said control means is responsive to said corresponding other data output signal for transmitting an other control message.

21. The automated position means of claim 18 wherein said voice processing means is responsive to a voice signal for generating a data output signal identifying a number, said number representing one of a directory number and a calling card number.

22. The automated position means of claim 18 wherein said control means further controls accessing of data for customers of said interconnection network from a data base.

23. The automated voice position means of claim 18, wherein said switching system is further connected to at least one attended operator position and wherein said control means is further responsive to a data message signifying an answer signal from a called terminal from said switching system, for transmitting a data message to said switching system requesting connecting said called terminal to an operator position.

24. The automated position means of claim 18, wherein said switching system is connectable to at least one attended operator position, for generating a data message to said switching system requesting reconnection of a call from said automated position means to said at least one attended operator position.

25. The automated position means of claim 24, wherein data messages from said automated position means are essentially the same as data messages from said at least one operator position.

26. The automated position means of claim 18, further comprising a voice interface to said switching network, and wherein said voice processing means is shared by a plurality of said voice interfaces.

27. The automated position means of claim 18, further comprising a voice interface to said switching network, and wherein said control means is shared by a plurality of said voice interfaces.

28. In a telecommunications system, comprising a switching system having a plurality of ports each for connection to an operator position, for offering operator assistance services, a method of serving an operator assistance call, comprising the steps of:
   in response to a receipt of signals from a calling customer terminal identifying said call as an operator assistance call and identifying a called customer destination, connecting a calling customer terminal to automated position means connected to one of said ports for serving operator assistance calls, said means comprising automated voice processing means for recognizing incoming speech data;
   analyzing a voice command received from said calling customer terminal by said automated voice processing means to identify a class of said operator assistance call; and
   transmitting a request from said automated position means to said switching system to request an interconnection network to set up a connection from said switching system to said called customer destination in response to said identification, said request being essentially the same as a corresponding request from an attended operator position.

29. The method of claim 28 further comprising:
   detecting an answer from a terminal at said called customer destination; and
   under control of said automated position means, requesting a connection from said calling customer terminal to an operator position connectable to said switching system after said step of detecting an answer.

30. The method of claim 29 further comprising the steps of:
   accessing a data base for said calling customer terminal to obtain calling customer data; and
   transmitting to said automated position means a subset of said calling customer data.

31. In a telecommunications system, comprising a switching system having a plurality of ports each for connection to an operator position, for offering operator assistance services, a method of setting up a calling card call comprising the steps of:
   connecting a call from a calling customer terminal to automated position means connected to one of said ports for processing assistance calls, said automated position means comprising automated voice processing means for processing speech input and generating speech output, in response to a receipt of signals from said calling customer terminal comprising an indication that said call is an operator assistance call and a directory number of a called customer terminal;
   in said automated position means receiving a voice command corresponding to a calling card number from said calling customer terminal;
   in said automated position means analyzing said voice command to identify said calling card number;
   verifying validity of said identified calling card number; and
   responsive to a positive verifying, sending a request to said switching system for establishment of a connection from said switching system to said called customer terminal, said request being essentially the same as a corresponding request from an attended operator position.

32. The method of claim 31 wherein said verifying comprises:
   transmitting a data message from said position means to said switching system, said message comprising said identified calling card number.

33. In a telecommunications system, comprising a switching system having a plurality of ports each for connection to an operator position, for offering operator assistance services, a method of setting up a calling card call comprising the steps of:
   connecting a call from a calling customer terminal to automated position means connected to one of said ports for processing assistance calls, said automated position means comprising automated voice processing means for processing speech input and generating speech output, in response to a receipt of signals from said calling customer terminal comprising an indication that said call is an operator assistance call and a directory number of a called customer terminal;
   in said automated position means receiving keyed tone signals corresponding to a calling card number from said calling customer terminal;
   in said automated position means analyzing said tone signals to identify said calling card number;
   verifying validity of said identified calling card number; and
   responsive to a positive verifying, sending a request to said switching system, from said automated position means, for establishment of a connection from said switching system to said called customer terminal, said request being essentially the same as a corresponding request from an attended operator position.

34. In a telecommunications system, comprising a switching system having a plurality of ports each for connection to an operator position, for offering operator assistance services, a method of setting up a bill to third number call comprising the steps of:
   connecting a calling customer terminal to automated position means connected to one of said ports for processing assistance calls, said automated position means comprising automated voice processing means for processing speech input and generating speech output, in response to a receipt of signals from said calling customer terminal comprising a directory number of a called customer terminal and an indication that said call is an operator assistance call;
   in said automated position means, analyzing a first voice command received from said calling customer terminal by said automated voice processing system to identify the class of said call as a bill to third number call;
   in said automated position means, receiving keyed tone signals from said calling customer terminal corresponding to a third number to be billed for said call;

in said automated position means, analyzing said keyed tone signals to identify said third number to be billed for this call;

from said automated position means, prompting said calling customer to speak a name and recording a response to said prompting;

from said automated position means, transmitting a request to said switching system, said request being essentially the same as a corresponding request from an attended operator position;

responsive to said request, setting up a connection from said switching system to a customer terminal for said third number;

detecting an answer by said customer terminal for said third number;

from said automated position means, announcing a message to said customer terminal for said third number, said message comprising said response;

in said automated position means, detecting a positive command given in response to said message from said customer terminal for said third number; and responsive to detecting said positive command, completing a connection from said calling customer terminal to said called customer terminal.

35. In a telecommunications system, comprising a switching system having a plurality of ports each for connection to an operator position, for offering operator assistance services, a method of setting up a bill to third number call comprising the steps of:

connecting a calling customer terminal to automated position means connected to one of said ports for processing assistance calls, said automated position means comprising automated voice processing means for processing speech input and generating speech output, in response to a receipt of signals from said calling customer terminal comprising a directory number of a called customer terminal and an indication that said call is an operator assistance call;

in said automated position means, analyzing a first voice command received from said calling customer terminal by said automated voice processing system to identify the class of said call as a bill to third number call;

in said automated position means, receiving a second voice command from said calling customer terminal corresponding to a third number to be billed for said call;

in said automated position means, analyzing said second voice command to identify said third number to be billed for this call; and verifying validity of said third number, said verifying comprising transmitting a data message from said position means to said switching system, said message comprising said identified third number, said data message being essentially the same as a corresponding message from an attended operator position.

36. In a telecommunications system, comprising a switching system having a plurality of ports each for connection to an operator position, for offering operator assistance services, a method of setting up a person-to-person call comprising the steps of:

connecting a calling customer terminal to an automated position means connected to one of said ports for processing calls, said automated position means comprising an automated voice processing system, in response to a receipt of signals from said calling customer terminal comprising an indication that said call is an operator assistance call and the directory number of a called customer terminal;

in said automated position means, analyzing a voice command received from said calling customer terminal by said automated voice processing system to identify the class of said call as a person-to-person call;

from said automated position means, transmitting a request to said switching system to request an interconnection network to set up a connection to a called customer terminal in response to said identification, said request being essentially the same as a corresponding request from an attended operator position;

detecting an answer by said called customer terminal; and from said automated position means, after said answer has been detected, requesting connection of an attended operator position to said calling customer terminal.

37. In a telecommunications system comprising a switching system having a plurality of ports each for connection to an operator position, for offering operator assistance services, a method of serving an operator assistance call, comprising the steps of:

in response to a receipt of signals from a calling customer terminal comprising a directory number of a called customer terminal and identifying said call as an operator assistance call, connecting said calling customer terminal to automated position means connected to one of said ports for processing assistance calls, said automated position means comprising automated voice processing means for processing speech input and generating speech output;

analyzing a voice command received from said calling customer terminal by said automated voice processing means to identify the class of said operator assistance call;

transmitting a data message to a controller of said switching system to request the establishment of a connection from said switching system to said called customer terminal in response to said identification; and monitoring performance of said automated position means by connecting an operator headset to the connection to said automated position means;

wherein said data message is essentially the same as a corresponding data message transmitted from an attended operator position to request an establishment of a connection to said called terminal.

38. The method of claim 37 further comprising:

in response to data messages received from said switching system, controlling a display of said automated position means to display data in a manner essentially similar to a display of data for an attended operator position.

39. In a telecommunications system, comprising a switching system, having a plurality of ports each for connection to an operator position, for offering operator assistance services, a method of serving an operator assistance call, comprising the steps of:

in response to a receipt of signals from a calling customer terminal comprising a directory number of a called customer terminal and identifying said call as an operator assistance call, connecting said calling customer terminal to automated position means connected to one of said ports for processing assistance calls, said automated position means comprising automated voice processing means for processing speech input and generating speech output;

analyzing a voice command received from said calling customer terminal by said automated voice processing means to identify a class of said operator assistance call;

transmitting a data message to a controller of said switching system to request the establishment of a connection from said switching system to said called customer terminal in response to said identification, said data message being essentially the same as a corresponding message from an attended operator position; and monitoring performance of said automated position means by connecting an attended operator position to said switching system in parallel to said automated position means;

wherein said data message is essentially the same as a corresponding data message transmitted from an attended operator position to request an establishment of a connection to said called terminal.

40. In a switching system having controller means for controlling said system to establish call connections, an automated operator service method using a service circuit connectable through a switching network of said system to a caller for furnishing operator-like automated speech interactions with that caller on special service calls normally requiring operator assistance for their completion, and as a substitute for operator position services, the method comprising:

in said service circuit, analyzing a speech command issued by said caller in response to a prompting signal and received in said service circuit to automatically identify a class of each said special service call;

in said service circuit, analyzing said class to determine a requested connection for each call;

transmitting a data message from said service circuit to said controller means for controlling establishment of a requested connection for said each call;

wherein said controller means is connectable to attended operator position means via a hardware/software interface, and wherein said transmitting comprises:

transmitting said data message over a hardware/software interface that is essentially identical with said hardware/software interface connectable to said operator position means.

41. A service circuit means for use in a switching system having controller means for controlling said system to establish call connections, said service circuit means connectable through a switching network of said system to a caller for furnishing operator-like automated speech interactions with that caller on special service calls normally requiring operator assistance for their completion, and as a substitute for operator position services, said service circuit means comprising:

means for analyzing a speech command issued by said caller in response to a prompting signal and received in said service circuit means to automatically identify a class of each said special service call;

means for analyzing said class to determine a requested connection for each call;

means for transmitting a data message to said controller means for controlling establishment of a requested connection for said each call;

wherein said controller means is connectable to attended operator position means via a hardware/software interface; and wherein said means for transmitting comprises means for transmitting said data message over a hardware/software interface that is essentially identical with said hardware/software interface connectable to said operator position means.

42. Service circuit means for use in a telecommunications system, comprising a switching system having a switching network for serving a call whose destination is specified by signals from a caller and having controller means for controlling said network, the service circuit means comprising:

speech recognition equipment adapted for analyzing speech signals from a caller of said call connected to said service circuit means through said network, to produce a signal for identifying a class of said call; and control means responsive to said signal for identifying received from said speech recognition equipment for sending a switching network request message to said controller means for requesting connection of said call to said destination;

wherein said controller means is connectable to attended operator position means via a hardware/software interface for exchanging data communications with said attended operator position means; and wherein said control means communicates with said controller means over a hardware/software interface that is essentially the same as the hardware/software interface for communicating with said attended operator position means.

43. The service circuit means of claim 42 further comprising announcement means for announcing voice messages to a terminal of said destination.

44. The service circuit means of claim 43 wherein said control means is responsive to data signals, from said controller means for informing said control means of an answer signal, for causing said announcement means to announce a request to issue a prespecified command to a terminal at said destination.

45. The service circuit means of claim 44 wherein said control means is responsive to signals from said speech recognition equipment identifying said prespecified command to transmit another request message to said controller means to request a connection between a terminal serving said caller and said terminal at said destination.

46. The service circuit means of claim 45 wherein said speech recognition equipment is further adapted to recognize dual tone multifrequency (DTMF) signals and wherein said prespecified command is a DTMF signal.

47. The service circuit means of claim 44 wherein said network is further connected to at least one attended operator position and wherein said control means is further responsive to the detection by said speech recognition equipment of a command from said terminal at said destination for transmitting a request message to said controller means to connect said terminal at said destination to an attended operator position.

48. The service circuit means of claim 42 wherein said speech recognition equipment is adapted for recognizing dual tone multifrequency (DTMF) signals.

49. The service circuit means of claim 42 further comprising:

display equipment for displaying incoming message data at said service circuit means in a format essentially similar to a format for display of said incoming message data at an operator position; and means for monitoring voice input to said service circuit means;

whereby performance of said service circuit means can be monitored by an attendant who hears customer input and sees displays similar to displays at an attended operator position.

50. In a switching system for serving operator assistance calls having ports and a software/hardware interface for connection to attended operator positions, a method of processing an operator assistance call comprising:

connecting automated position means, comprising speech recognition equipment to one of said ports;

responsive to receiving an operator assistance call whose destination is specified by dialed signals from a caller, connecting said call via said one port to said automated position means;

analyzing speech signals from a caller of said call to identify a class of said call; and responsive to the class identification, transmitting a request message from said automated position means via said software/hardware interface to a controller of said switching system for controlling establishment of a connection to said destination;

whereby a common software/hardware interface is used for calls to an attended operator position and automated position means.

51. Automated position means for connection to an operator assistance telecommunications system, said system for connection to attended operator positions, said automated position means comprising:

speech recognition means for analyzing speech signals from callers and for generating data signals representing identified speech signals;

speech synthesis means for producing announcement signals for transmission to said callers;

control means responsive to said data signals for generating first data messages for transmission from said control means to said operator assistance system, and responsive to second data messages received by said control means from said operator assistance system for producing said announcement signals;

wherein said first and second data messages are essentially the same as corresponding data messages transmitted from or received in an attended operator position.

* * * * *

UNITED STATES PATENT AND TRADEMARK OFFICE
CERTIFICATE OF CORRECTION

PATENT NO. : 5,163,083

DATED : November 10, 1992

INVENTOR(S) : Douglas C. Dowden, Richard W. Hemmeter, Diane E. Herr, Richard J. Piereth, Samuel M. Salchenberger, Chander S. Sehgal, Mahendra K. Verma It is certified that error appears in the above-identified patent and that said Letters Patent is hereby corrected as shown below:

Column 24, line 33, claim 19, delete "one of".

Signed and Sealed this

Nineteenth Day of October, 1993

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,163,083
DATED : November 10, 1992
INVENTOR(S) : Dowden et al.

It is certified that error appears in the above-indentified patent and that said Letters Patent is hereby corrected as shown below:

Abstract, second column, line 14 of the Abstract, after "a call to an" delete "automated" and substitute --attended operator--.

Signed and Sealed this

Twenty-first Day of May, 1996

Attest:

BRUCE LEHMAN

*Attesting Officer*     *Commissioner of Patents and Trademarks*